US011658729B2

(12) United States Patent
Zhang et al.

(10) Patent No.: US 11,658,729 B2
(45) Date of Patent: May 23, 2023

(54) FULL DUPLEX DOWNLINK AND UPLINK BEAM PAIR SELECTION

(71) Applicant: QUALCOMM Incorporated, San Diego, CA (US)

(72) Inventors: Qian Zhang, Basking Ridge, NJ (US); Yan Zhou, San Diego, CA (US); Tao Luo, San Diego, CA (US); Navid Abedini, Basking Ridge, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 91 days.

(21) Appl. No.: 17/302,200

(22) Filed: Apr. 27, 2021

(65) Prior Publication Data

US 2021/0351838 A1  Nov. 11, 2021

Related U.S. Application Data

(60) Provisional application No. 63/022,310, filed on May 8, 2020.

(51) Int. Cl.
*H04B 7/08* (2006.01)
*H04W 24/10* (2009.01)
(Continued)

(52) U.S. Cl.
CPC ......... *H04B 7/0888* (2013.01); *H04B 7/0626* (2013.01); *H04B 17/336* (2015.01); *H04L 5/1461* (2013.01); *H04W 24/10* (2013.01)

(58) Field of Classification Search
CPC .. H04B 7/0888; H04B 7/0626; H04B 17/336; H04L 5/1461; H04W 24/10
See application file for complete search history.

(56) References Cited

U.S. PATENT DOCUMENTS

2017/0238294 A1\* 8/2017 Lim .................. H04B 7/0695
  370/277
2018/0083679 A1\* 3/2018 Lim .................. H04B 17/336
(Continued)

FOREIGN PATENT DOCUMENTS

WO      2018098969 A1    6/2018
WO   WO-2019164363 A1 \*  8/2019
(Continued)

OTHER PUBLICATIONS

Jong-Bu Lim, Seoul (KR); Byung-Hwan Lee, Gyeonggi-do (KR); Ji-Yun Seol, Gyeonggi-do (KR); Chae-Hee Lim, Gyeonggi-do (KR) Apparatus and Method for Performing Beamforming Operation in Wireless; Feb. 12, 2016 (KR) 10-2016-0016501 (Year: 2016).\*
(Continued)

*Primary Examiner* — Deepa Belur
(74) *Attorney, Agent, or Firm* — Harrity & Harrity, LLP

(57) ABSTRACT

Various aspects of the present disclosure generally relate to wireless communication. In some aspects, a user equipment (UE) may receive, in a full duplex transmission mode, a measurement trigger indicating a set of candidate base station beam pairs, wherein a candidate base station beam pair comprises a base station uplink (UL) beam and a base station downlink (DL) beam, wherein the corresponding identified UE beam pair comprises a UE UL beam and a UE DL beam, wherein the set of candidate base station beam pairs are identified based at least in part on a base station self-interference measurement; and transmit, to the base station, a beam measurement report based at least in part on a plurality of beam measurements obtained based at least in part on the measurement trigger. Numerous other aspects are provided.

30 Claims, 13 Drawing Sheets

(51) Int. Cl.
   *H04B 7/06*       (2006.01)
   *H04L 5/14*       (2006.01)
   *H04B 17/336*     (2015.01)

(56) References Cited

U.S. PATENT DOCUMENTS

| | | | |
|---|---|---|---|
| 2018/0199328 A1* | 7/2018 | Sang | H04B 7/0617 |
| 2019/0260485 A1 | 8/2019 | Byun et al. | |
| 2020/0145967 A1* | 5/2020 | Park | H04W 72/042 |
| 2022/0110106 A1* | 4/2022 | Kiilerich Pratas | H04W 24/10 |
| 2022/0264318 A1* | 8/2022 | Nilsson | H04B 7/088 |
| 2022/0279370 A1* | 9/2022 | Guan | H04B 17/336 |

FOREIGN PATENT DOCUMENTS

| | | | |
|---|---|---|---|
| WO | 2019210982 A1 | 11/2019 | |
| WO | WO-2021177664 A1 * | 9/2021 | |

OTHER PUBLICATIONS

International Search Report and Written Opinion—PCT/US2021/070478—ISA/EPO—dated Oct. 11, 2021.
Partial International Search Report—PCT/US2021/070478—ISA/EPO—dated Aug. 19, 2021.

* cited by examiner

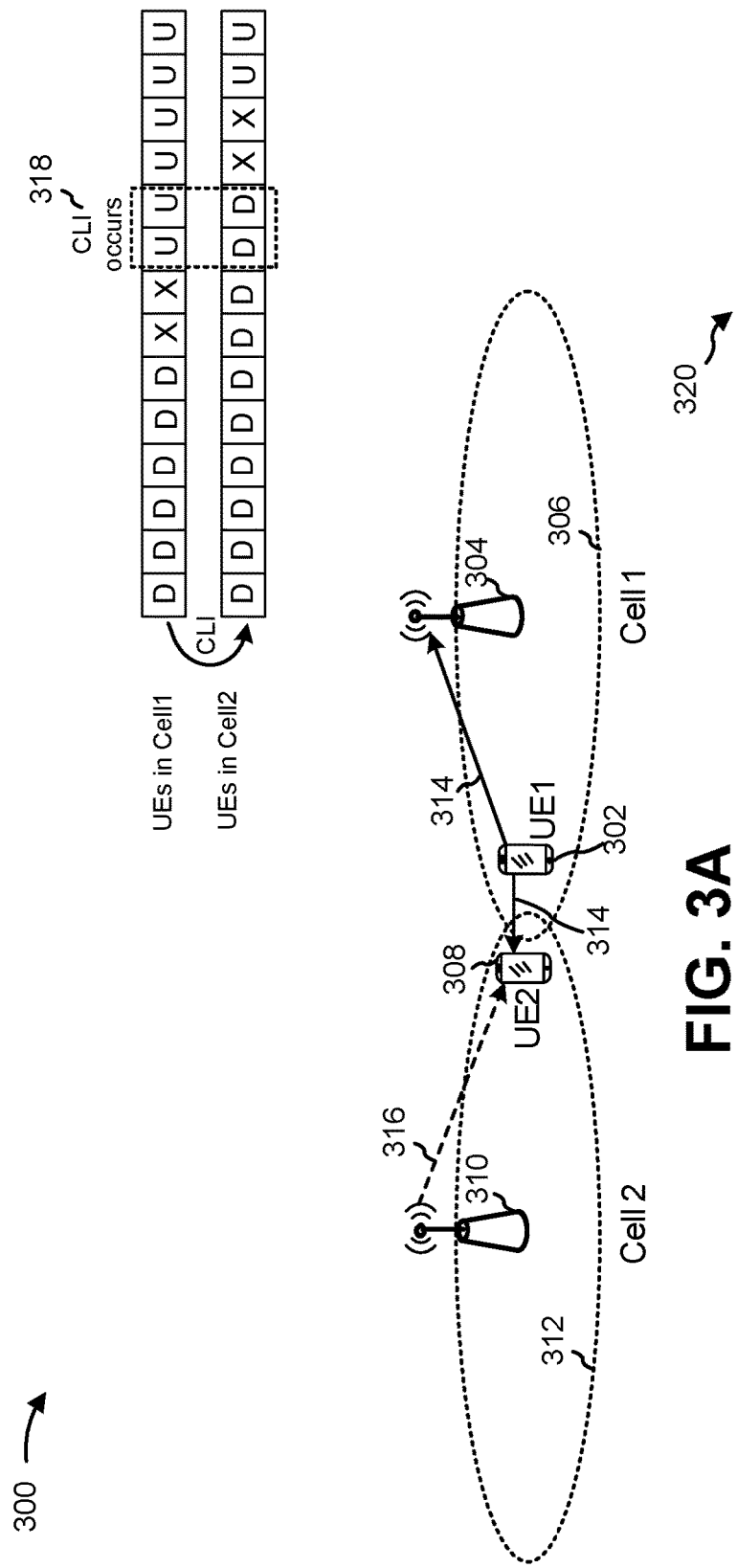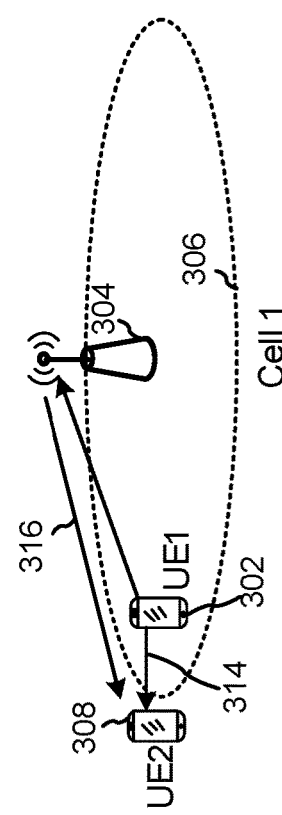

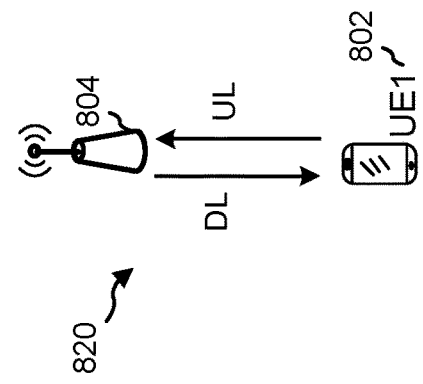
FIG. 8B
FIG. 8C
FIG. 8A

FULL DUPLEX DOWNLINK AND UPLINK BEAM PAIR SELECTION

CROSS-REFERENCE TO RELATED APPLICATION

This Patent Application claims priority to U.S. Provisional Patent Application No. 63/022,310, filed on May 8, 2020, entitled "FULL DUPLEX DOWNLINK AND UPLINK BEAM PAIR SELECTION," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for full duplex downlink and uplink beam pair selection.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. "Downlink" (or "forward link") refers to the communication link from the BS to the UE, and "uplink" (or "reverse link") refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

Full-duplex (FD) communication refers to contemporaneous uplink and downlink communication by a single device using the same time resources. FD communication may provide a reduction in latency, enhance spectral efficiency per cell or per UE, and allow for a more efficient utilization of resources.

SUMMARY

In some aspects, a method of wireless communication, performed by a user equipment, may include receiving, from a base station, in a full duplex transmission mode, a measurement trigger indicating a set of candidate base station beam pairs, wherein a candidate base station beam pair in the set of candidate base station beam pairs is associated with a corresponding identified UE beam pair in a set of identified UE beam pairs and comprises a base station uplink (UL) beam and a base station downlink (DL) beam, wherein the corresponding identified UE beam pair comprises a UE UL beam and a UE DL beam, wherein the set of candidate base station beam pairs are identified based at least in part on a base station self-interference measurement (SIM); and transmitting, to the base station, a beam measurement report based at least in part on a plurality of beam measurements obtained based at least in part on the measurement trigger.

In some aspects, a method of wireless communication, performed by a base station, may include transmitting, to a UE, in a full duplex transmission mode, a measurement trigger indicating a set of candidate base station beam pairs, wherein a candidate base station beam pair in the set of candidate base station beam pairs is associated with a corresponding identified UE beam pair in a set of identified UE beam pairs and comprises a base station UL beam and a base station DL beam, wherein the corresponding identified UE beam pair comprises a UE UL beam and a UE DL beam, wherein the set of candidate base station beam pairs are identified based at least in part on a base station SIM; and receiving, from the UE, a beam measurement report based at least in part on a plurality of beam measurements obtained based at least in part on the measurement trigger.

In some aspects, a user equipment for wireless communication may include a memory and one or more processors coupled to the memory. The memory and the one or more processors may be configured to receive, from a base station, in a full duplex transmission mode, a measurement trigger indicating a set of candidate base station beam pairs, wherein a candidate base station beam pair in the set of candidate base station beam pairs is associated with a corresponding identified UE beam pair in a set of identified UE beam pairs and comprises a base station UL beam and a base station DL beam, wherein the corresponding identified UE beam pair comprises a UE UL beam and a UE DL beam, wherein the set of candidate base station beam pairs are identified based at least in part on a base station SIM; and transmit, to the base station, a beam measurement report based at least in part on a plurality of beam measurements obtained based at least in part on the measurement trigger.

In some aspects, a base station for wireless communication may include a memory and one or more processors coupled to the memory. The memory and the one or more processors may be configured to transmit, to a UE, in a full duplex transmission mode, a measurement trigger indicating a set of candidate base station beam pairs, wherein a candidate base station beam pair in the set of candidate base station beam pairs is associated with a corresponding identified UE beam pair in a set of identified UE beam pairs and comprises a base station UL beam and a base station DL beam, wherein the corresponding identified UE beam pair comprises a UE UL beam and a UE DL beam, wherein the set of candidate base station beam pairs are identified based at least in part on a base station SIM; and receive, from the UE, a beam measurement report based at least in part on a plurality of beam measurements obtained based at least in part on the measurement trigger.

In some aspects, a non-transitory computer-readable medium may store one or more instructions for wireless communication. The one or more instructions, when executed by one or more processors of a UE, may cause the one or more processors to receive, from a base station, in a full duplex transmission mode, a measurement trigger indicating a set of candidate base station beam pairs, wherein a candidate base station beam pair in the set of candidate base station beam pairs is associated with a corresponding identified UE beam pair in a set of identified UE beam pairs and comprises a base station UL beam and a base station DL beam, wherein the corresponding identified UE beam pair comprises a UE UL beam and a UE DL beam, wherein the set of candidate base station beam pairs are identified based at least in part on a base station SIM; and transmit, to the base station, a beam measurement report based at least in part on a plurality of beam measurements obtained based at least in part on the measurement trigger.

In some aspects, a non-transitory computer-readable medium may store one or more instructions for wireless communication. The one or more instructions, when executed by one or more processors of a base station, may cause the one or more processors to transmit, to a UE, in a full duplex transmission mode, a measurement trigger indicating a set of candidate base station beam pairs, wherein a candidate base station beam pair in the set of candidate base station beam pairs is associated with a corresponding identified UE beam pair in a set of identified UE beam pairs and comprises a base station UL beam and a base station DL beam, wherein the corresponding identified UE beam pair comprises a UE UL beam and a UE DL beam, wherein the set of candidate base station beam pairs are identified based at least in part on a base station SIM; and receive, from the UE, a beam measurement report based at least in part on a plurality of beam measurements obtained based at least in part on the measurement trigger.

In some aspects, an apparatus for wireless communication may include means for receiving, from a base station, in a full duplex transmission mode, a measurement trigger indicating a set of candidate base station beam pairs, wherein a candidate base station beam pair in the set of candidate base station beam pairs is associated with a corresponding identified UE beam pair in a set of identified UE beam pairs and comprises a base station UL beam and a base station DL beam, wherein the corresponding identified UE beam pair comprises a UE UL beam and a UE DL beam, wherein the set of candidate base station beam pairs are identified based at least in part on a base station SIM; and means for transmitting, to the base station, a beam measurement report based at least in part on a plurality of beam measurements obtained based at least in part on the measurement trigger.

In some aspects, an apparatus for wireless communication may include means for transmitting, to a UE, in a full duplex transmission mode, a measurement trigger indicating a set of candidate base station beam pairs, wherein a candidate base station beam pair in the set of candidate base station beam pairs is associated with a corresponding identified UE beam pair in a set of identified UE beam pairs and comprises a base station UL beam and a base station DL beam, wherein the corresponding identified UE beam pair comprises a UE UL beam and a UE DL beam, wherein the set of candidate base station beam pairs are identified based at least in part on a base station SIM; and means for receiving, from the UE, a beam measurement report based at least in part on a plurality of beam measurements obtained based at least in part on the measurement trigger.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, or artificial intelligence-enabled devices). Aspects may be implemented in chip-level components, modular components, non-modular components, non-chip-level components, device-level components, or system-level components. Devices incorporating described aspects and features may include additional components and features for implementation and practice of claimed and described aspects. For example, transmission and reception of wireless signals may include a number of components for analog and digital purposes (e.g., hardware components including antennas, RF chains, power amplifiers, modulators, buffers, processor(s), interleavers, adders, or summers). It is intended that aspects described herein may be practiced in a wide variety of devices, components, systems, distributed arrangements, or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIG. 3A is a diagram illustrating a wireless network operating in a semi-static time division duplex (TDD) configuration.

FIG. 3B is a diagram illustrating a wireless network operating in a dynamic TDD configuration.

FIGS. 8A-8C are diagrams illustrating examples of full duplex communication.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
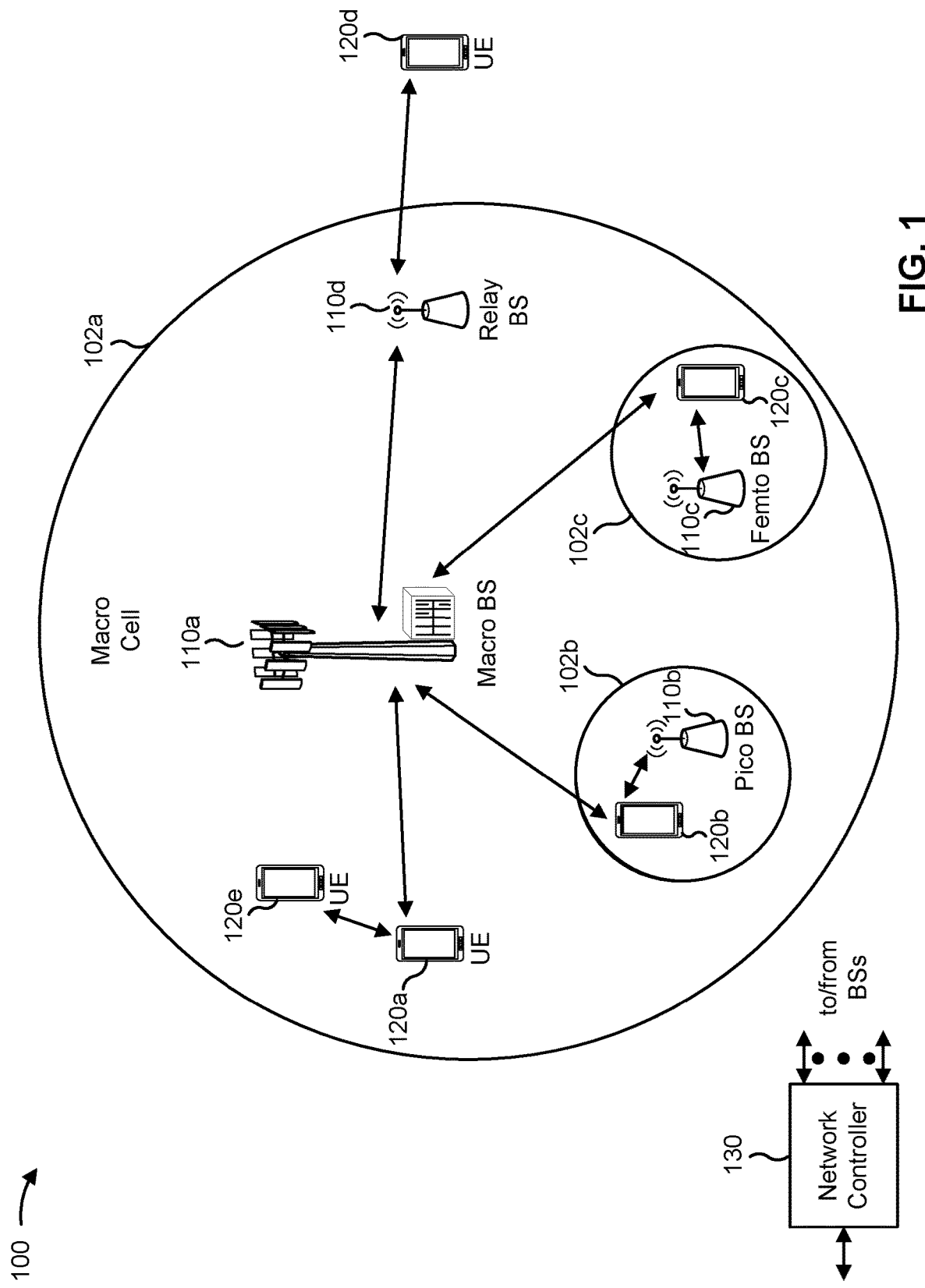
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG.

1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, directly or indirectly, via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
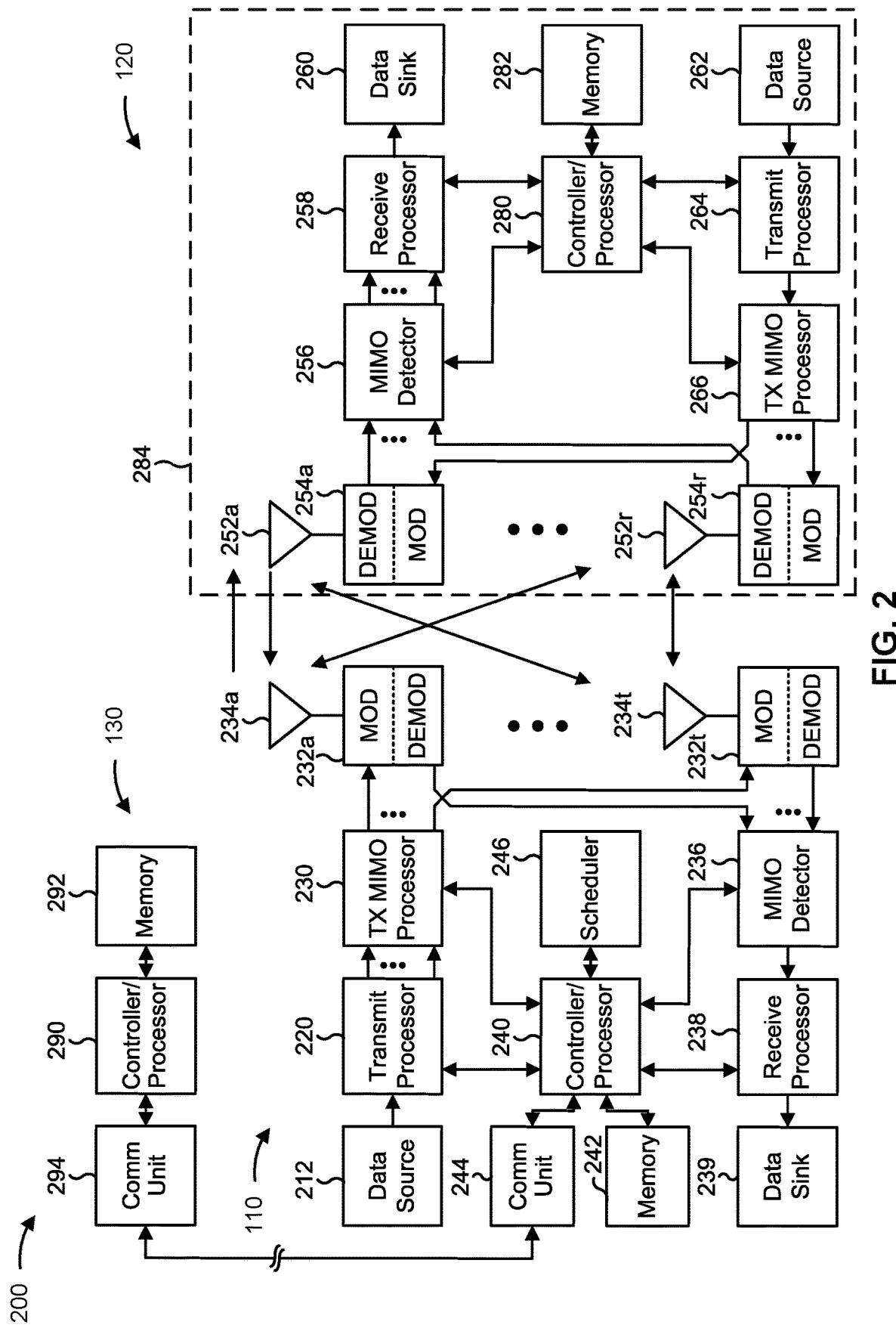
FIG. 2 is a diagram illustrating an example of a base station in communication with a UE in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a channel quality indicator (CQI) parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein (for example, as described with reference to FIGS. 9-13).

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein (for example, as described with reference to FIGS. 9-13).

Controller/processor 240 of base station 110, controller/processor 280 of UE 120, and/or any other component(s) of FIG. 2 may perform one or more techniques associated with full duplex downlink and uplink beam pair selection, as described in more detail elsewhere herein. For example, controller/processor 240 of base station 110, controller/processor 280 of UE 120, and/or any other component(s) of FIG. 2 may perform or direct operations of, for example, process 1200 of FIG. 12, process 1300 of FIG. 13, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 1200 of FIG. 12, process 1300 of FIG. 13, and/or other processes as described herein. In some aspects, executing instructions may include running the instructions, converting the instructions, compiling the instructions, and/or interpreting the instructions, among other examples.

In some aspects, UE 120 may include means for receiving, from a base station, in a full duplex transmission mode, a measurement trigger indicating a set of candidate base station beam pairs, wherein a candidate base station beam pair in the set of candidate base station beam pairs is associated with a corresponding identified UE beam pair in a set of identified UE beam pairs and comprises a base station uplink (UL) beam and a base station downlink (DL) beam, wherein the corresponding identified UE beam pair comprises a UE UL beam and a UE DL beam, wherein the set of candidate base station beam pairs are identified based at least in part on a base station self-interference measurement (SIM), means for transmitting, to the base station, a beam measurement report based at least in part on a plurality of beam measurements obtained based at least in part on the measurement trigger, and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

In some aspects, base station 110 may include means for transmitting, to a UE, in a full duplex transmission mode, a measurement trigger indicating a set of candidate base station beam pairs, wherein a candidate base station beam pair in the set of candidate base station beam pairs is associated with a corresponding identified UE beam pair in a set of identified UE beam pairs and comprises a base station UL beam and a base station DL beam, wherein the corresponding identified UE beam pair comprises a UE UL beam and a UE DL beam, wherein the set of candidate base station beam pairs are identified based at least in part on a base station SIM, means for receiving, from the UE, a beam measurement report based at least in part on a plurality of beam measurements obtained based at least in part on the measurement trigger, and/or the like. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, antenna 234, and/or the like.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

FIG. 3A is a diagram illustrating a wireless network 300 operating in a semi-static time division duplex (TDD) configuration. FIG. 3B is a diagram illustrating a wireless network 320 operating in dynamic TDD configuration. Dynamic TDD may enhance spectrum efficiency of wireless communication networks and provide a higher throughput by dynamically altering UL or DL transmission direction. However, if nearby UEs have different TDD UL-DL slot formats, one UE (e.g., UE2 308) may be a victim and may receive an UL transmission from another UE (e.g., UE1 302) known as an aggressor. The received UL transmission from the UE1 302 is known as cross link interference (CLI). CLI occurs when a UL symbol (e.g., an interfering symbol) of an aggressor collides with a DL symbol (e.g., an interfered symbol) of a victim. CLI may be caused by a UL transmission from the aggressor UE (e.g., UE1 302). The configuration of dynamic TDD is able to change dynamically in response to a change of traffic pattern. For example, in instances where the traffic pattern is UL heavy, dynamic TDD may recognize the change in the traffic pattern and adapt by providing more UL symbols to meet the demand. Alternatively, in instances where the traffic pattern is DL heavy, dynamic TDD may provide more DL symbols to meet the demand.

In FIG. 3A, UE1 302 is within Cell1 306 and is being served by base station 304, while UE2 308 is within Cell2 312 and is being served by base station 310. CLI may occur between UEs at the cell edges of nearby cells, as UEs at cell edges of nearby cells may be in close proximity to each other. As shown in FIG. 3A, UE1 302 and UE2 308 are at their respective cell edges, and may be communicating with their respective base stations. UE1 302 may send a UL transmission 314 to base station 304, while UE2 308 is receiving a DL transmission 316 from base station 310. However, in certain instances, the UL transmission 314 sent by UE1 302 to base station 304 may also be received by UE2 308 while receiving the DL transmission 316 from base station 310. The UL transmission 314 from UE1 302 received by UE2 308 causes UL transmission 314 and may interfere with the DL transmission 316 UE2 308 from base station 310. As such, one or more UL symbols of the UL transmission 314 may collide with one or more DL symbols of the DL transmission 316. In the example of FIG. 3A, two UL symbols of the UL transmission 314 overlap or collide with two DL symbols of the DL transmission 316, such that CLI occurs at the overlap 318.

In the example of FIG. 3B, both UE1 302 and UE2 308 are being served by the same cell (e.g., cell 1 306). Both UE 1 302 and UE2 308 are near the cell edge, and in some instances, the UL transmission 314 sent by UE1 302 to base station 304 may also be received by UE2 308 while receiving the DL transmission 316 from base station 304. The UL transmission 314 from UE1 302 received by UE2 may cause UL transmission 314 and may interfere with the DL 316 of UE2 308 from the base station 304. As a result, one or more UL symbols of the UL transmission 314 may collide with one or more DL symbols of the DL transmission 316.

CLI measurements metrics include sounding reference signals reference signal received power (SRS-RSRP) and CLI-received signal strength indicator (CLI-RSSI). SRS-RSRP may include the linear average of the power contributions of the SRS to be measured over the configured resource elements within the considered measurement frequency bandwidth in the time resources in the configured measurement occasions. CLI-RSSI may include the linear average of the total received power observed only in certain OFDM symbols of measurement time resource(s), in the measurement bandwidth, over the configured resource elements for measurement by the UE. For both SRS-RSRP and CLI-RSSI measurement reports, both events may be triggered, and periodic reporting is supported. Layer3 (L3) filtering may be applied, such that for CLI-RSSI measurements, the implementation of the UE may determine whether to reset filtering upon a bandwidth part (BWP) switch. A dedicated measurement gap may not be needed.

As indicated above, FIGS. 3A and 3B are provided as one or more examples. Other examples may differ from what is described with regard to FIGS. 3A and 3B.

Figure 4:
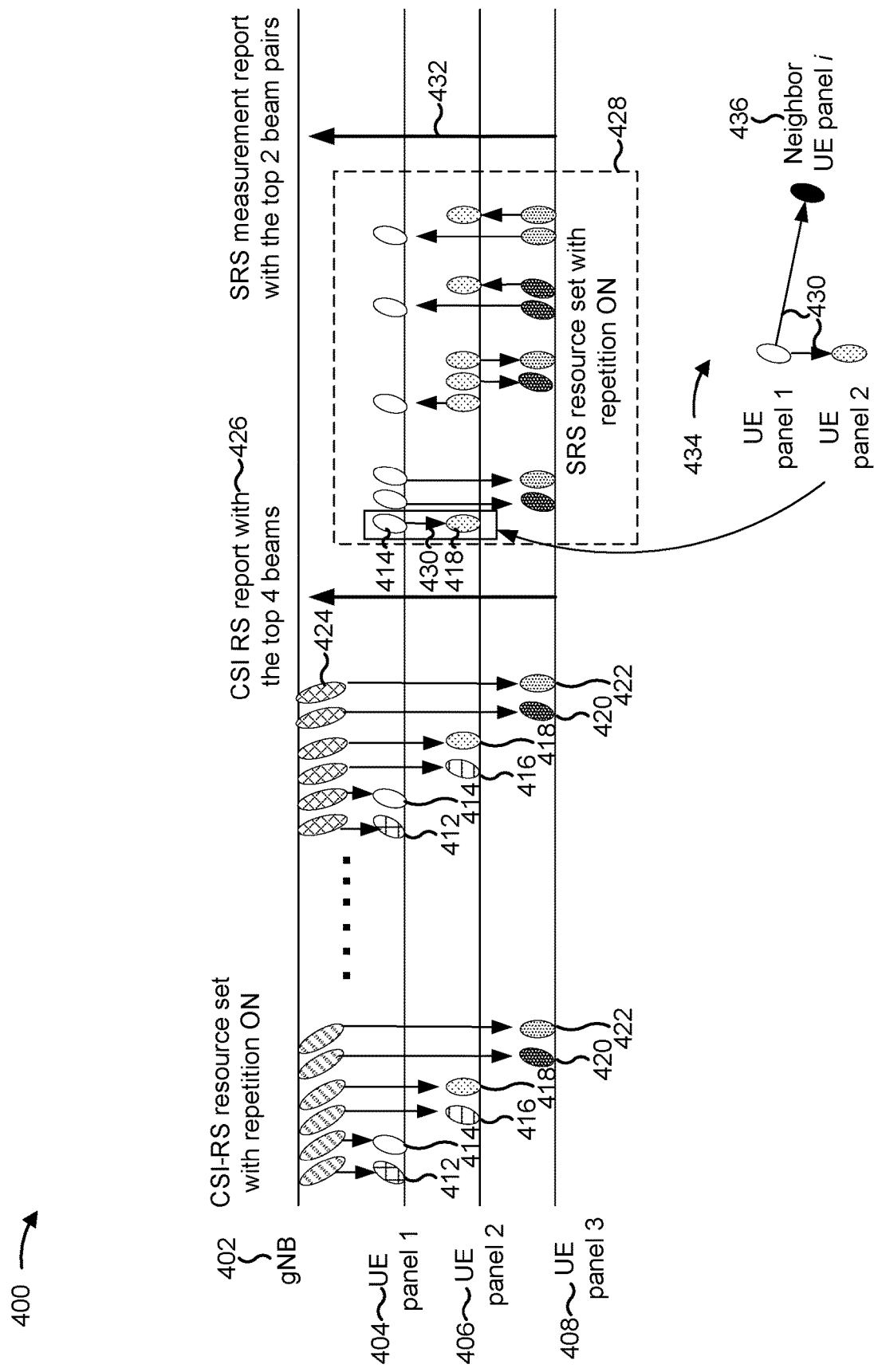
FIG. 4 is a diagram illustrating an example of self-interference measurement based at least in part on a CSI-RS measurement for beam management.

FIG. 4 is a diagram illustrating an example 400 of self-interference measurement based at least in part on a CSI-RS measurement for beam management. Example 400 involves a base station 402 (shown as a gNB), and a UE comprising multiple UE panels (e.g., UE panels 1, 2, and 3, shown by reference numbers 404, 406, and 408, respectively). Generally, beams are represented by ovals in FIG. 4. An oval with a given fill represents a beam, and two or more ovals with the same fill, at different locations in FIG. 4, may represent the same receive beam or transmit beam at different times. For example, reference number 410 shows a set of channel state information reference signals (CSI-RSs) that are transmitted by the base station 402 on a first beam in a CSI-RS resource set with repetition. The UE may measure the CSI-RSs using respective receive beams 412, 414, 416, 418, 420, 422. Reference number 424 shows a set of CSI-RSs that are transmitted by the base station 402 on a second beam in a CSI-RS resource set with repetition. Again, the UE may measure the CSI-RSs using the respective receive beams 412, 414, 416, 418, 420, 422.

As shown by reference number 426, the UE may transmit a CSI-RS report to the base station 402. The CSI-RS report may indicate a top N beams, determined based at least in part on the measurements performed using the receive beams 412 through 422. In example 400, N is 4, though N may be some other number. The top N beams may be selected based at least in part on one or more metrics, described elsewhere herein. Here, the 4 CSI-RS beams associated with the 4 Rx beams 414, 418, 420, and 422, are selected (not shown).

Reference number 428 shows the determination of self-interference measurements by the UE 120 based at least in part on the selected beams. An arrow from a first beam to a second beam may indicate that the first beam transmits a reference signal that is measured using the second beam to determine a self-interference measurement. For example, the arrow shown by reference number 430 indicates the transmission of a sounding reference signal (SRS) using the beam 414 that is measured using the beam 418 to determine a self-interference measurement for this Tx and Rx beam pair. The SRSs may be associated with an SRS resource set with repetition configured. In example 400, each pairing of transmit and receive beams from beams 414, 418, 420, and 422 are measured with the exception of the beam pairs formed by beams 420 and 422, since beams 420 and 422 are associated with the same panel. As shown by reference number 432, the UE may transmit an SRS measurement report indicating a top 2 beam pairs based at least in part on the self-interference measurements determined in connection with reference number 428.

As shown by reference number 434, in some aspects, a UE may determine a cross-link interference (CLI) measurement based at least in part on a reference signal associated with a self-interference measurement. For example, the same SRS transmission used to measure self-interference from beam 414 to beam 418 may be used by a neighbor UE to measure CLI at a panel i of the neighbor UE, as shown by reference number 436.

As indicated above, FIG. 4 is provided as an example. Other examples may differ from what is described with regard to FIG. 4.

Figure 5:
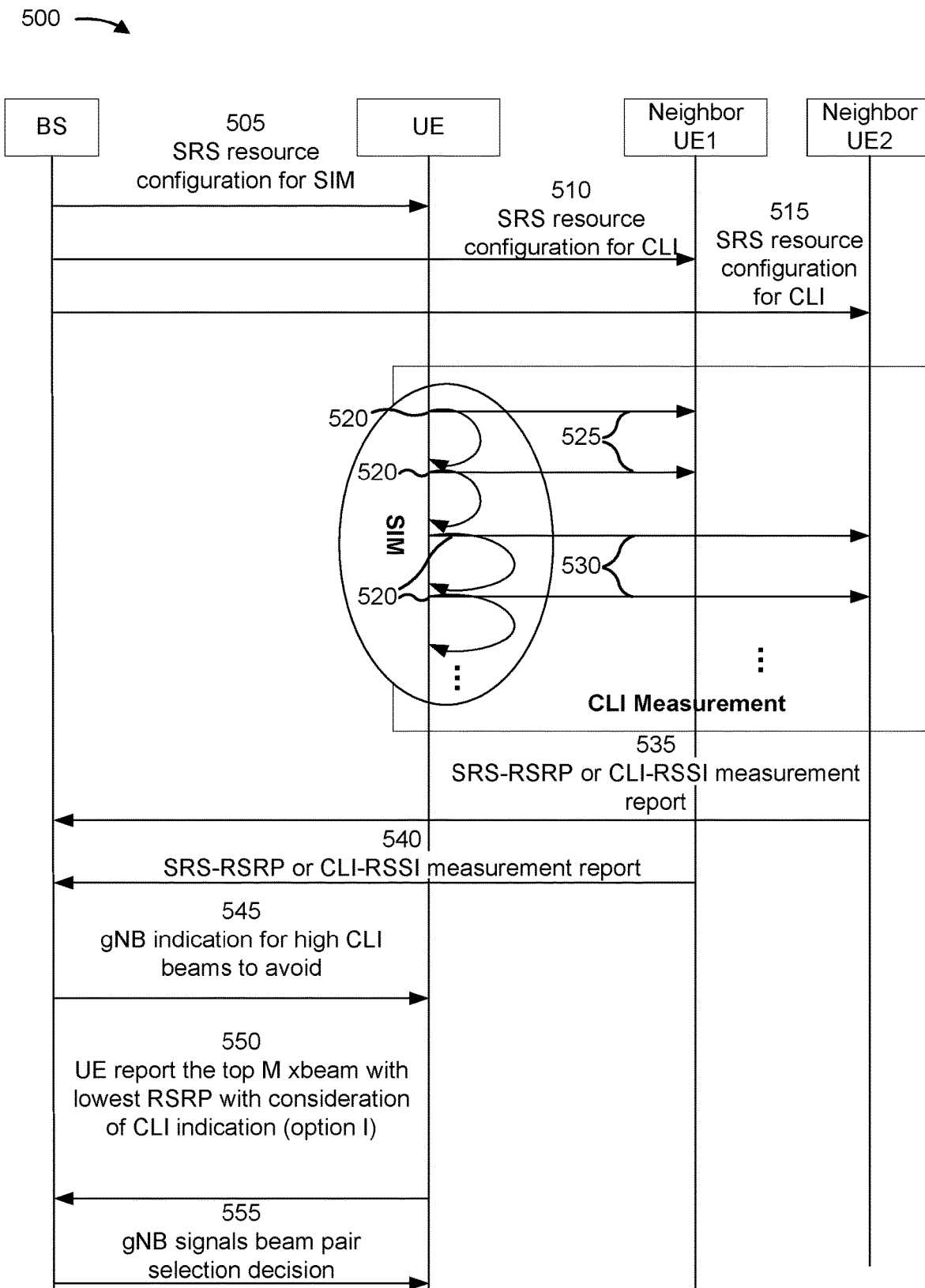
FIG. 5 is a diagram illustrating an example of signaling associated with self-interference measurement for a UE and cross-link interference measurement for one or more neighbor UEs.

FIG. 5 is a diagram illustrating an example 500 of signaling associated with self-interference measurement for a UE and cross-link interference measurement for one or more neighbor UEs. As shown, example 500 includes a BS (e.g., BS 110), a UE (e.g., UE 120), and two neighbor UEs (e.g., UE 120), shown as Neighbor UE1 and Neighbor UE2.

As shown by reference number 505, the BS may provide, to the UE, a resource configuration for self-interference measurement (SIM). For example, the resource configuration may be an SRS resource configuration that indicates one or more SRSs to be transmitted by the UE 120. As shown by reference numbers 510 and 515, the BS may provide, to the neighbor UEs, resource configurations for CLI measurement. For example, the resource configurations for CLI measurement may be associated with or may share resources with the SRS resource configuration for the SRSs to be transmitted by the UE for SIM. As shown by reference number 520, the UE may transmit SRSs, and may perform SIM based at least in part on the SRSs. The curved arrows from the SRSs back to the UE indicate that the UE performs SIM based at least in part on the SRSs. As shown by reference number 525 and 530, the neighbor UEs may perform CLI measurements, in accordance with the SRS resource configuration, using the SRSs transmitted by the UE.

As shown by reference numbers 535 and 540, the neighbor UEs may transmit measurement reports based at least in part on the CLI measurements. For example, the measurement reports may include an SRS reference signal received power (RSRP) report, a CLI received signal strength indicator (RSSI) report, and/or the like. In some aspects, as shown by reference number 545, the BS may provide, to the UE, an indication of one or more beams, associated with high CLI measurements (e.g., CLI measurements that satisfy a threshold), that the UE is to avoid.

As shown by reference number 550, the UE may report a top M crossbeams (xbeams) (M is an integer) with a lowest RSRP of the beams measured by the UE. In some aspects, the top M crossbeams may be selected based at least in part on the CLI indication shown by reference number 545. As shown by reference number 555, the BS may transmit information indicating a beam pair selection decision. For example, the BS may select a UL/DL beam pair for the UE, and may signal the selected UL/DL beam pair to the UE. In some aspects, the BS may select the UL/DL beam pair based at least in part on the CLI measurement feedback shown by reference numbers 535 and 540.

Figure 6:
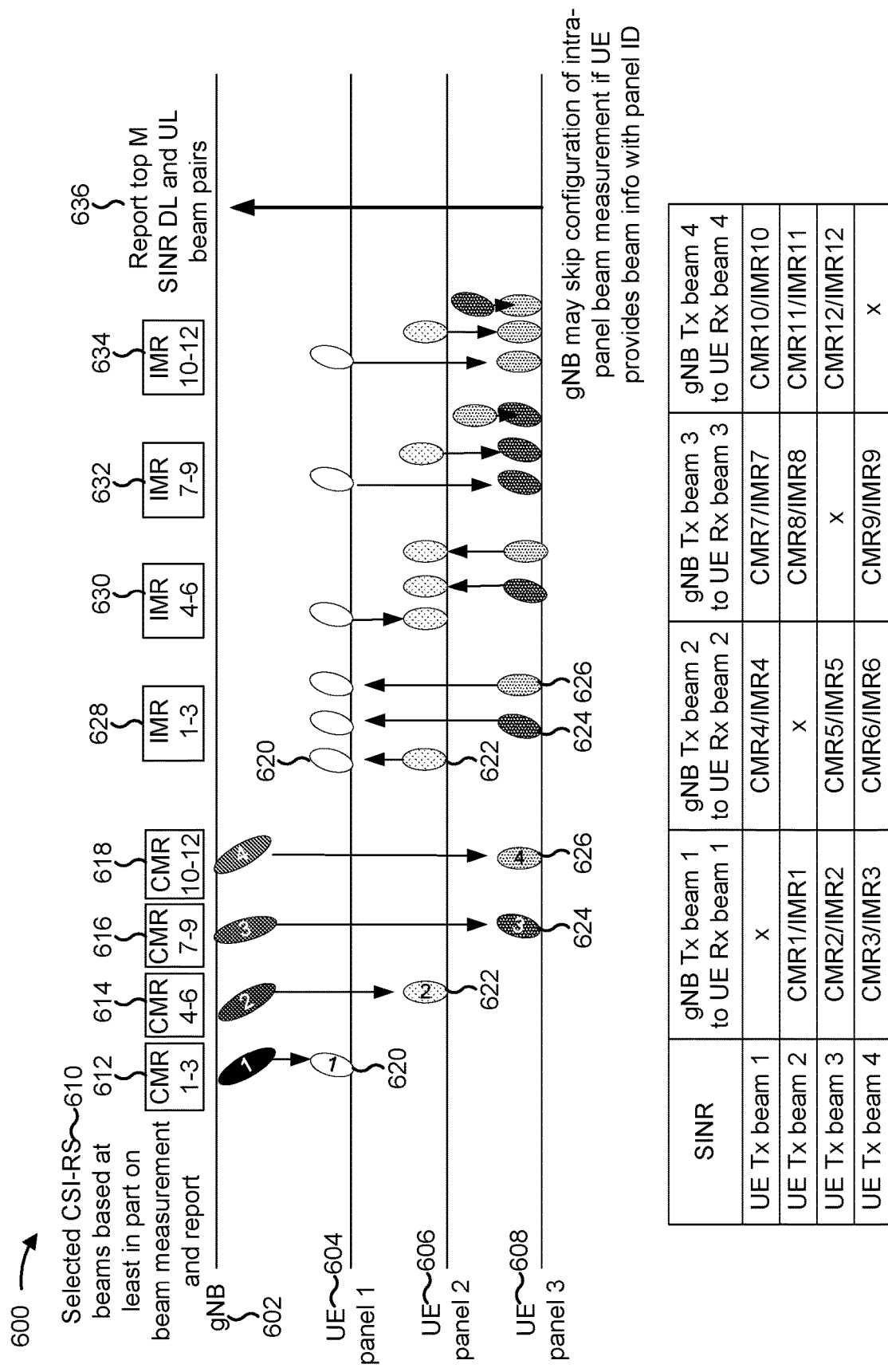
FIG. 6 is a diagram illustrating a beam measurement process.

FIG. 6 is a diagram 600 illustrating a beam measurement process. The diagram 600 of FIG. 6 includes a base station 602, and a UE comprising multiple UE panels (e.g., UE panel1 604, UE panel2 606, UE panel3 608). The base station 602 and UE may be configured to select CSI-RS beams based at least in part on a beam measurement procedure (e.g., 610). The beam measurement procedure 610 may allow for the UE panels (e.g., 604, 606, 608) to measure CSI-RS signals from the base station 602 to determine which of the Rx beams are the best at the UE side, which may be based at least in part on the DL signal strength measured at the UE panels, and each Rx beam is associated with a Tx CSI-RS beam at the base station. The beam measurement procedure 610 may allow for the base station 602 to transmit multiple CSI-RS resources to the UE panels in order to measure the DL channel quality or signal strength at the UE side. The UE may send a CSI-RS report to the base station 602 indicating the top Tx beams at the base station with each of the top Tx beams associated with a top Rx beam at the UE side. The top Rx beams may be assumed to be the top Tx beams at the UE panels based at least in part on channel reciprocity. In some aspects, the UE may report the top four Tx beams. However, in some aspects, the UE may report more or less than the top four Tx beams. Upon the determination of the top four Tx beams with its associated top Rx beams at the UE, the UE may perform a SIM. The UE may also report the top four beams, each with an associated panel ID of the UE, so that the gNB can avoid configuring intra-panel SIM to save resource overhead.

To perform the SIM, the UE may transmit a transmission from the beam 620 from UE panel1 604, such that beams 622, 624, and 626 may measure the amount of energy they receive from the transmission of the beam 620. The transmission from the beam 620 may be an uplink transmission to the base station 602; however, during the uplink transmission from beam 620 to the base station 602, some energy may be received at the beams of the other panels. Such energy may be due to side lobes or based at least in part on the configuration of the other panels. As a result, the beams 622, 624, and 626 may measure the amount of self-interference that is caused by the transmission from the beam 620. This process repeats for all of the top four beams indicated in the CSI-RS report. For example, beam 622 may send a transmission such that beams 620, 624, and 626 measure the amount of self-interference caused by the transmission from beam 622. Upon the completion of the self-interference procedure and the channel measurement procedure, an indication 636 may be sent to the base station 602 indicating the top DL and UL beam pairs of the UE in an L1-SINR report via either the actual value or a largest value plus differential value of SINR. The DL and UL beams pairs selected as the top DL and UL beam pairs are beams that have passed a threshold for selection. In some aspects, the UE may report that no beams pass the threshold, such that no feasible beam and/or beam pair is present. The report may indicate, for example, that no beam is to be used.

To perform the self-interference, a modified Layer 1 Signal to Interference plus Noise Ratio (L1-SINR) configuration and procedure may be utilized. L1-SINR may include two resource settings, the first resource setting (which may be provided by the higher layer parameter resources-ForChannelMeasurement) is configured to perform channel measurement (CM) via CSI-RS. The CM may measure the channel quality. The second resource (which may be provided by either higher layer parameter csi-IM-Resources-ForInterference or the higher layer parameter nzp-CSI-RS-ResourcesForInterference) is configured to perform interference measurement (IM) via CSI-RS. The modified L1-SINR may be configured to utilize SRS, instead of CSI-RS, to perform the IM procedure for SIM purposes. Each CSI-RS resource for channel measurement resource (CMR) may be associated with one SRS resource for interference measurement resource (IMR). The number of CSI-RS resources for CM may equal to the number of SRS resources for IM. The CMR may also be re-used for the original L1-SINR beam management purposes. In addition, the IMR may also be reused for CLI measurement purposes concurrently to measure the CLI at neighbor UEs using the same SRS resources used for SIM. In some aspects, the IMR configuration may be configured to define a full or reduced Tx power. For example, the reduced Tx power may be based at least in part on X dBm or X % of the full Tx power. The UE may use the configuration to scale up the calculated SINR accordingly.

In FIG. 6, the diagram 600 provides an example of the CM and IM using the modified L1-SINR configuration and procedure. The CM portion includes four CMRs 612, 614, 616, 618 such that the base station 602 is configured to transmit a CSI-RS to each of the top four Rx beams of the UE. For example, CMR 612 may be transmitted to Rx beam 620 of UE panel1 604, CMR 614 may be transmitted to Rx beam 622 of UE panel2 606, CMR 616 may be transmitted to Rx beam 624 of UE panel3 608, and CMR 618 may be transmitted to Rx beam 626 of UE panel3 608. The UE may measure the channel quality received at the UE by the corresponding Rx beams. The UE may store the channel quality measurements under the CMR to determine the SINR.

The IM portion includes the same amount of, or more, resources as in the CM portion, such that the CMRs are mapped to a corresponding IMR. For example, each CMR is associated with an IMR for the interference measurement. Each CMR can also be mapped to multiple IMRs for measuring the interference to the same Rx beam as the CMR but using transmissions from different beams of different panels of the UE. The IM portion includes four IMRs 628, 630, 632, 634 that are mapped to a corresponding CMRs. For example, CMR 612 may be mapped to IMR 628, CMR 614 may be mapped to IMR 630, CMR 616 may be mapped to IMR 632, and CMR 618 may be mapped to IMR 634. The IM portion allows for SIM to be performed. To perform SIM, the IMRs configure the UE with SRS resources. Each of the beams (e.g., 620, 622, 624, 626) may be configured to transmit an SRS. For example, the UE panels, when sending the uplink transmission for the SIM, may transmit an SRS. The transmitted SRS may be utilized to measure SIM. In some aspects, the UE panel1 604 may transmit the SRS at beam 620, such that beams 622, 624, and 626 may measure the amount of self-interference that is caused by the transmission from the beam 620. This process repeats for all the other beams 622, 624, 626. For example, beam 622 may send a transmission such that beams 620, 624, and 626 measure the amount of self-interference caused by the transmission from beam 622. Upon the completion of the CM and the SIM, a SINR may be determined.

The mapping of the CMRs and the IMRs allows for an SINR to be calculated based at least in part on the results of the CM and IM portions. The SINR may be determined based at least in part on a ratio of the CMR and the corresponding IMR, as shown in the table of FIG. 6.

The example of FIG. 6 provides an example of CM and IM resources being time division multiplexed (TDM), such that the CM portion and the IM portion occur at different times. In some aspects, a DL timing may be utilized for the CM, while a UL timing may be utilized for the IM. In such instances, the SINR may be calculated based at least in part on a ratio of CM and IM and noise (e.g., CM/(IM+noise)). Based upon the calculations of the SINR, the UE may report the SINR results to the base station 602. The SINR results may include a report of the top SINR DL and UL beam pairs.

As indicated above, FIG. 6 is provided as an example. Other examples may differ from what is provided with regard to FIG. 6.

Figure 7:
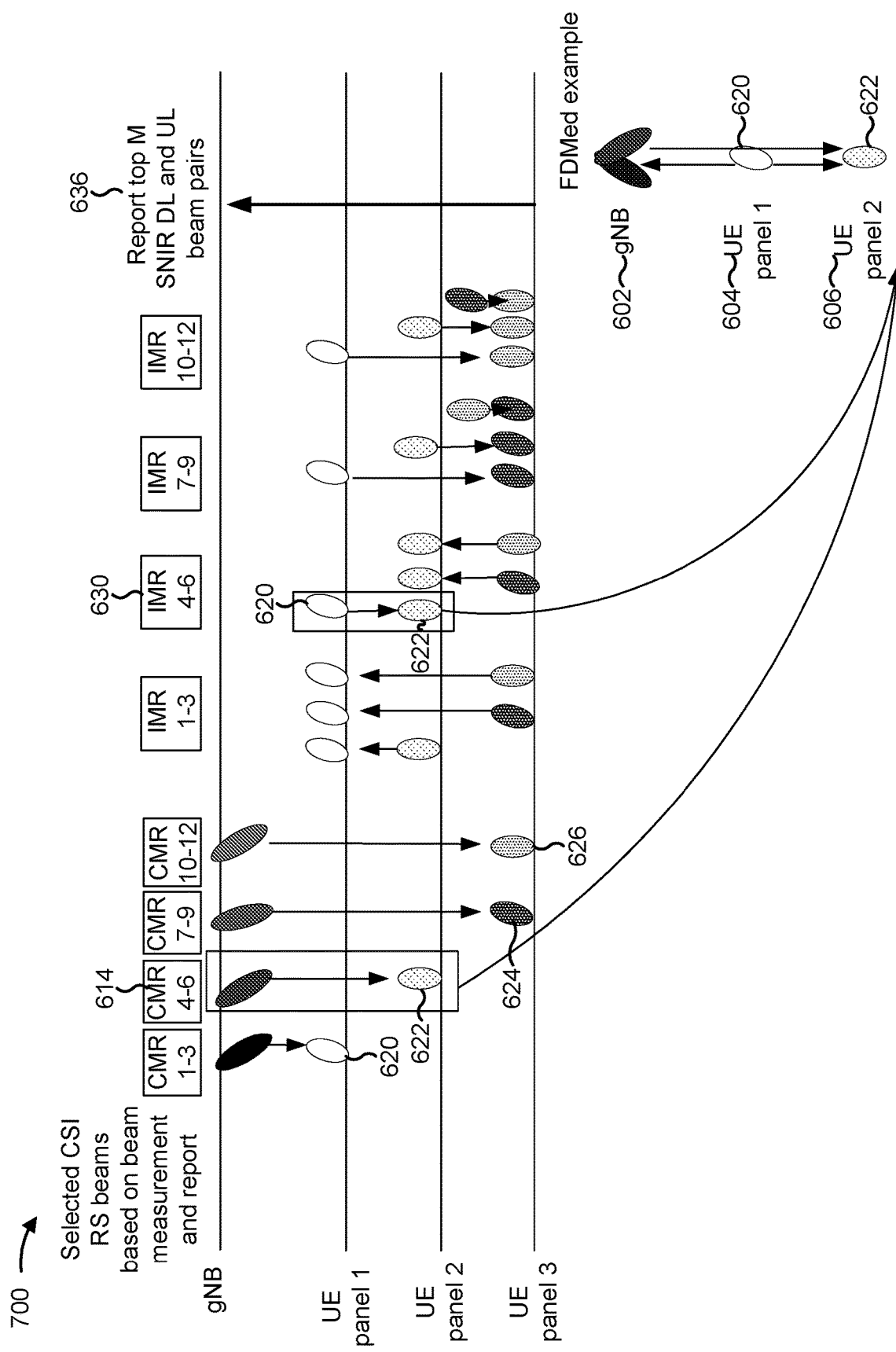
FIG. 7 is a diagram illustrating channel measurement and interference measurement using a modified L1-SINR configuration and procedure.

FIG. 7 is a diagram 700 illustrating CM and IM using a modified L1-SINR configuration and procedure. In the example of FIG. 7, the CM and IM resources are configured in a frequency division multiplexed (FDM) configuration, such that the CM and IM occur concurrently. For example, the CMR 614 and IMR 630 are shown in the FDM configuration. The base station 602 may transmit the CSI-RS to be received by beam 622 of UE panel2 606, while the beam 620 transmits the SRS that is received by beam 622 of UE panel2 606. The UE may measure the reception of the CSI-RS and the SRS in order to determine the SINR for the Rx beam 622. In some aspects, the CM and IM procedures under the FDM configuration may experience time misalignment for DL and/or UL reference signals (RSs). In some aspects, the UE may utilize DL timing or UL timing for both the CM and IM procedures concurrently happening in the FDM configuration. In aspects utilizing DL timing, the UE may calculate RSRP of the CSI-RS, and may calculate a partial RSSI for the interference; then an estimated SINR is calculated based at least in part on the CM and IM procedures.

In some aspects, an SINR may not be determined if the Rx and Tx beam are on the same panel. For example, with reference to FIG. 6, an SINR may not be determined for an Rx beam 624 and a Tx beam of 626, because they are on the same panel. However, the base station may not be aware of the panel ID when configuring the SRS resources for the IMR. In such aspects, the base station may be configured to indicate whether the UE should still transmit the SRS in instances where the SRS beam and the SIM beam are on the same panel. In some aspects, the base station may be configured to indicate whether the UE should still transmit the SRS if the SRS is being reused for a CLI measurement at a neighbor UE.

In some aspects, the UE may be configured to indicate that one or more particular beam pairs may be an infeasible beam pair, such that the SRS beam and the SIM beam are on the same panel. In some aspects, the UE may be configured to indicate to the UE the existence of one or more infeasible beam pairs during the SIM configuration phase. In response to receiving the indication of infeasible beam pairs, the base station may update the SIM configuration and skip or prevent the configuring of intra-panel beam measurements, which may contribute to wasting resources. In some aspects, if the UE indicates the existence of infeasible beam pairs, then the reported value of such beam pairs may be reported as background interference, instead of a self-interference value. In some aspects, such as for SIM, the UE may be configured to indicate beams associated with panel IDs such that the base station may avoid or skip the configuring of intra-panel SIM, which may assist in reducing and/or saving resource overhead.

As indicated above, FIG. 7 is provided as an example. Other examples may differ from what is described with regard to FIG. 7.

FIGS. 8A-8C are diagrams illustrating examples 800, 810, 820 of full duplex (FD) communication. The example 800 of FIG. 8A includes a UE1 802 and two base stations (e.g., TRPs) 804-1, 804-2, wherein the UE1 802 is sending UL transmissions to base station 804-1 and is receiving DL transmissions from base station 804-2. In the example 800 of FIG. 8A, FD is enabled for the UE1 802, but not for the base stations 804-1, 804-2. The example 810 of FIG. 8B includes two UEs, UE1 802-1 and UE2 802-2, and a base station 804, wherein the UE1 802-1 is receiving a DL transmission from the base station 804 and the UE2 802-2 is transmitting a UL transmission to the base station 804. In the example 810 of FIG. 8B, FD is enabled for the base station 804, but not for the UEs UE1 802-1 and UE2 802-2. The example 820 of FIG. 8C includes a UE1 802 and a base station 804, wherein the UE1 802 is receiving a DL transmission from the base station 804 and the UE1 802 is transmitting a UL transmission to the base station 804. In the example 820 of FIG. 8C, FD is enabled for both the UE1 802 and the base station 804.

The present disclosure generally relates to improving the manner in which flexible time division duplex (TDD) operates to allow for FD communication, simultaneous UL/DL transmission in frequency range 2 (FR2). Flexible TDD capability may be present at either a base station or UE, or both. For example, for a UE, UL transmission may be from one antenna panel, and DL reception may be in another antenna panel. FD communication may be conditional on a beam separation of the UL beam and DL beam at the respective antenna panels. In such cases, improving the manner in which the selection of the UL beam and DL beam for FD communication is performed is desirable. Utilizing FD communication may provide a reduction in latency, such that it may be possible to receive a DL signal in UL-only slots, which may enable latency savings. In addition, FD communication may enhance spectrum efficiency per cell or per UE, and may allow for a more efficient utilization of resources.

Beam separation of the UL and DL beams assist in limiting or reducing self-interference that may occur during FD communication. It is desirable to select UL and DL beams that are on different antenna panels to minimize self-interference. Determining the UL and DL beams that are separated on their respective antenna panels may provide a reliable FD communication by facilitating selection of beam pairs that minimize or reduce self-interference. Consequently, measuring the self-interference at the UE may assist in determining beam pairs of UL and DL beams that may support FD communication.

As indicated above, FIGS. 8A-8C are provided as one or more examples. Other examples may differ from what is described with regard to FIGS. 8A-8C.

A full-duplex (FD) UE may perform a self-interference measurement (SIM) procedure in order to identify self-interference from transmissions of the FD UE. An FD base station also may perform a SIM procedure in order to identify self-interference from transmissions of the FD base station. The UE may provide a measurement report to the base station to indicate results of the UE SIM. The base station may select pairs of beams (referred to herein as "beam pairs") for the UE ("UE beam pairs") and the base station ("base station beam pairs") to use during FD communications. A beam pair may include a UL beam and a DL beam. In some aspects, a beam pair may include a receive (Rx) beam and a transmit (Tx) beam. Performing SIMs and channel measurements (CMs) for all possible beam pairs may be computationally and time intensive.

Some techniques and apparatuses described herein provide for selection of beam pairs based on measurements performed with respect to fewer than all possible pairs of beams. In some aspects, a base station may indicate, to a UE, a set of candidate base station beam pairs and a corresponding set of identified UE beam pairs. The UE may perform a SIM associated with the identified UE beam pairs and report a top one or more UE beam pairs to the base station. The base station may select a base station beam pair and a UE beam pair from the candidate base station beam pairs and the one or more UE beam pairs, respectively. By limiting the possible beam pairs that are analyzed for final selection by the base station, aspects may facilitate reducing the consumption of time resources, computation resources, and/or the like.

Figure 9:
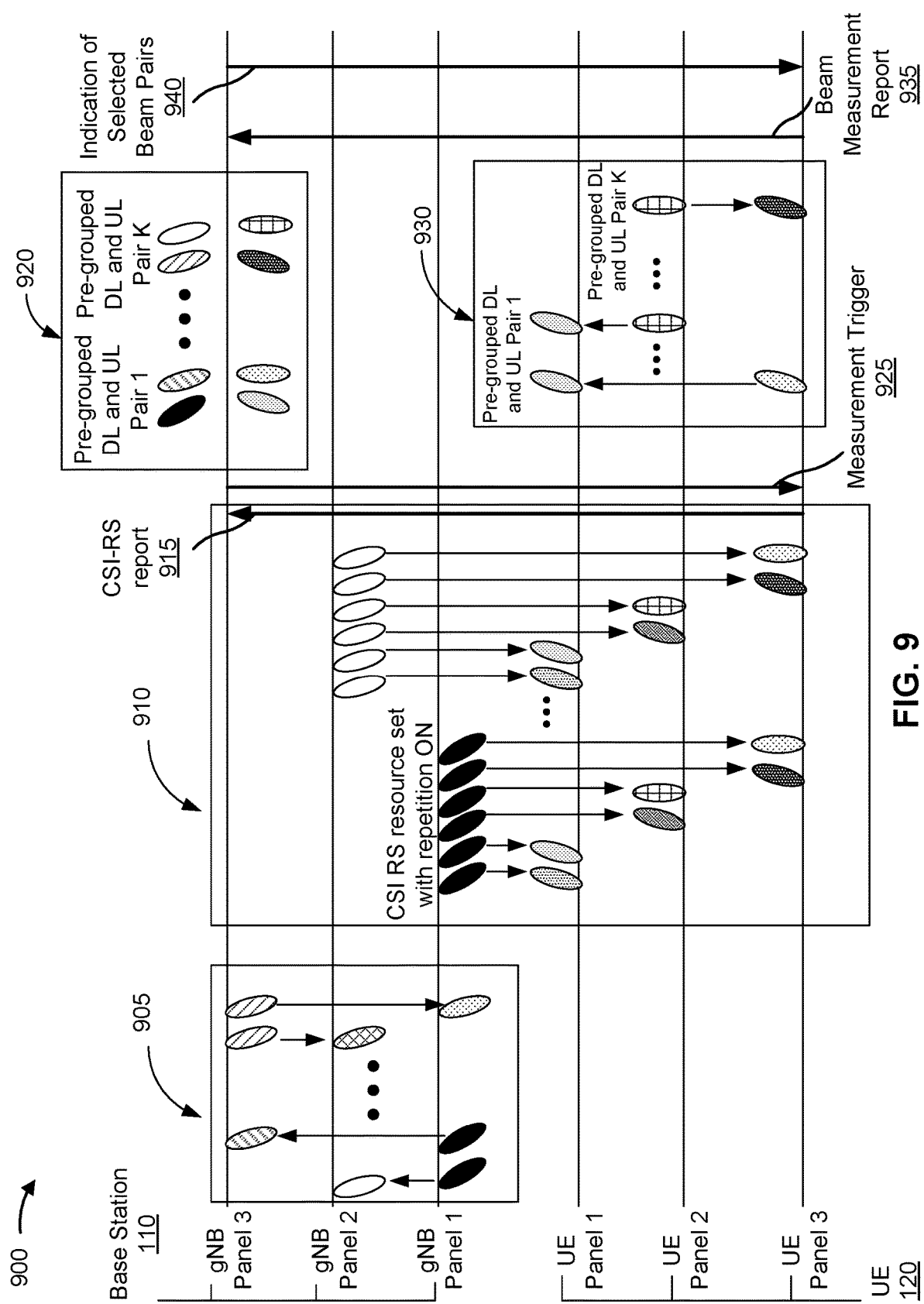
FIG. 9 is a diagram illustrating an example of beam pair selection using uplink and downlink measurements, in accordance with the present disclosure.

FIG. 9 is a diagram illustrating an example 900 of beam pair selection using uplink and downlink measurements, in accordance with the present disclosure. Example 900 includes antenna panels associated with a base station 110 (shown as "gNB panel 1," "gNB panel 2," and "gNB panel 3") and antenna panels associated with a UE 120 (shown as "UE panel 1," "UE panel 2," and "UE panel 3"). In some aspects, the base station 110 and/or the UE 120 may include fewer than three panels, three panels, or more than three panels.

As shown by reference number 905, the base station 110 may perform a base station SIM procedure to determine self-interference associated with base station Tx beams and base station Rx beams. The base station SIM may be performed in any number of different manners, as determined by network implementation. In some aspects, the base station SIM may be based at least in part on a transmission of a synchronization signal block (SSB), a channel state information reference signal (CSI-RS), and/or the like. In some aspects, the CSI-RS may include a dedicated CSI-RS transmitted using CSI-RS resources allocated for SIM. In some aspects, the CSI-RS may include a CSI-RS transmitted for use in a beam management procedure. In some aspects, the CSI-RS may include a channel measurement (CM) resource configured for use in a CM procedure.

As shown by reference number 910, the base station 110 may transmit, and the UE 120 may receive, a plurality of reference signals (RSs). In some aspects, the RSs may include CSI-RSs. The UE 120 may obtain a plurality of RS measurements based at least in part on the plurality of RSs. As shown by reference number 915, the UE 120 may transmit, and the base station 110 may receive, an RS report. In some aspects, the RS report may include a CSI-RS beam report. In some aspects, the CSI-RS beam report may indicate a set of beams that satisfy a first quality threshold, a set of beams that fail to satisfy a second quality threshold, and/or the like.

As shown by reference number 920, the base station 110 may identify a set of candidate base station beam pairs. In some aspects, the base station 110 may identify the set of candidate base station beam pairs based at least in part on the RS report. As shown by reference number 925, the base station 110 may transmit, and the UE 120 may receive, a measurement trigger.

In some aspects, the measurement trigger may indicate a set of candidate base station beam pairs. In some aspects, a candidate base station beam pair in the set of candidate base station beam pairs may be associated with a corresponding identified UE beam pair in a set of identified UE beam pairs. In some aspects, the candidate base station beam may include a base station UL beam and a base station DL beam. In some aspects, the corresponding identified UE beam pair may include a UE UL beam and a UE DL beam. In some aspects, the set of candidate base station beam pairs may be identified based at least in part on the base station SIM.

In some aspects, a pair of the set of candidate base station beam pairs may include a base station DL Tx RS beam that corresponds to a UE DL Rx RS beam. In some aspects, a pair of the set of candidate base station beam pairs may include a base station UL Rx RS beam that corresponds to a UE UL Tx RS beam. In some aspects, the measurement trigger may include an allocation, to the UE, of a resource for transmitting an RS for performing an intended beam measurement corresponding to a UE beam pair of the set of identified UE beam pairs.

In some aspects, the UE beam pair may include intra-panel UE beams and the base station may allocate resources to the UE 120 for measuring self interference associated with the intra-panel UE beams. However, because intra-panel beams likely will not be used for full duplex communication, the UE 120 may refrain from performing the measurement. In some aspects, for example, the UE 120 may refrain from transmitting the RS using the resource.

In some aspects, the UE 120 may transmit the RS using the resource and perform a measurement that is different than an intended self-interference beam measurement. In some aspects, the measurement may include at least one cross link interference (CLI) measurement associated with a neighbor UE 120. In some aspects, the measurement may include at least one background interference measurement.

As shown by reference number 930, the UE 120 may obtain a plurality of beam measurements. As described below in connection with FIG. 10, in some aspects, the UE 120 may obtain the plurality of beam measurements using a beam measurement procedure that is based at least in part on a CLI configuration. In some aspects, the beam management procedure may be performed concurrently with a CLI procedure. As described below in connection with FIG. 11, in some aspects, the UE 120 may obtain the plurality of beam measurements using a beam measurement procedure that is based at least in part on an L1-SINR measurement configuration.

As shown by reference number 935, the UE 120 may transmit, and the base station 110 may receive, a beam measurement report. In some aspects, the beam measurement report may include a UE SIM report. In some aspects, the beam measurement report may be based at least in part on the plurality of beam measurements obtained based at least in part on the measurement trigger. In some aspects, the beam measurement report may indicate one or more candidate UE beam pairs in the set of identified UE beam pairs. In some aspects, the one or more candidate UE beam pairs may be identified based at least in part on one or more of the plurality of beam measurements satisfying a threshold. In some aspects, the beam measurement report may indicate that no identified UE beam pairs are to be used based at least in part on none of the plurality of beam measurements satisfying the threshold.

As shown by reference number 940, the base station 110 may transmit, and the UE 120 may receive, an indication of a selected base station beam pair in the set of candidate base station beam pairs and a selected UE beam pair in the set of identified UE beam pairs. In some aspects, the selected base station beam pair and the selected UE beam pair may be selected based at least in part on the beam measurement report, the base station SIM, and/or the like.

In some aspects, to reduce unnecessary measurements, the UE 120 may transmit, and the base station 110 may receive, a beam filter indication. In some aspects, the beam filter indication may be transmitted with a CSI-RS report. The beam filter indication may facilitate filtering intra-panel beam pairs associated with the UE. In some aspects, the beam filter indication may indicate a panel identifier (ID) corresponding to a panel associated with the UE, an intra-panel relationship between two or more beams, and/or the like. In some aspects, the set of identified UE beam pairs may not include the two or more beams. In some aspects, a selected UE beam pair may not include the two or more beams.

As indicated above, FIG. 9 is provided as an example. Other examples may differ from what is described with respect to FIG. 9.

Figure 10:
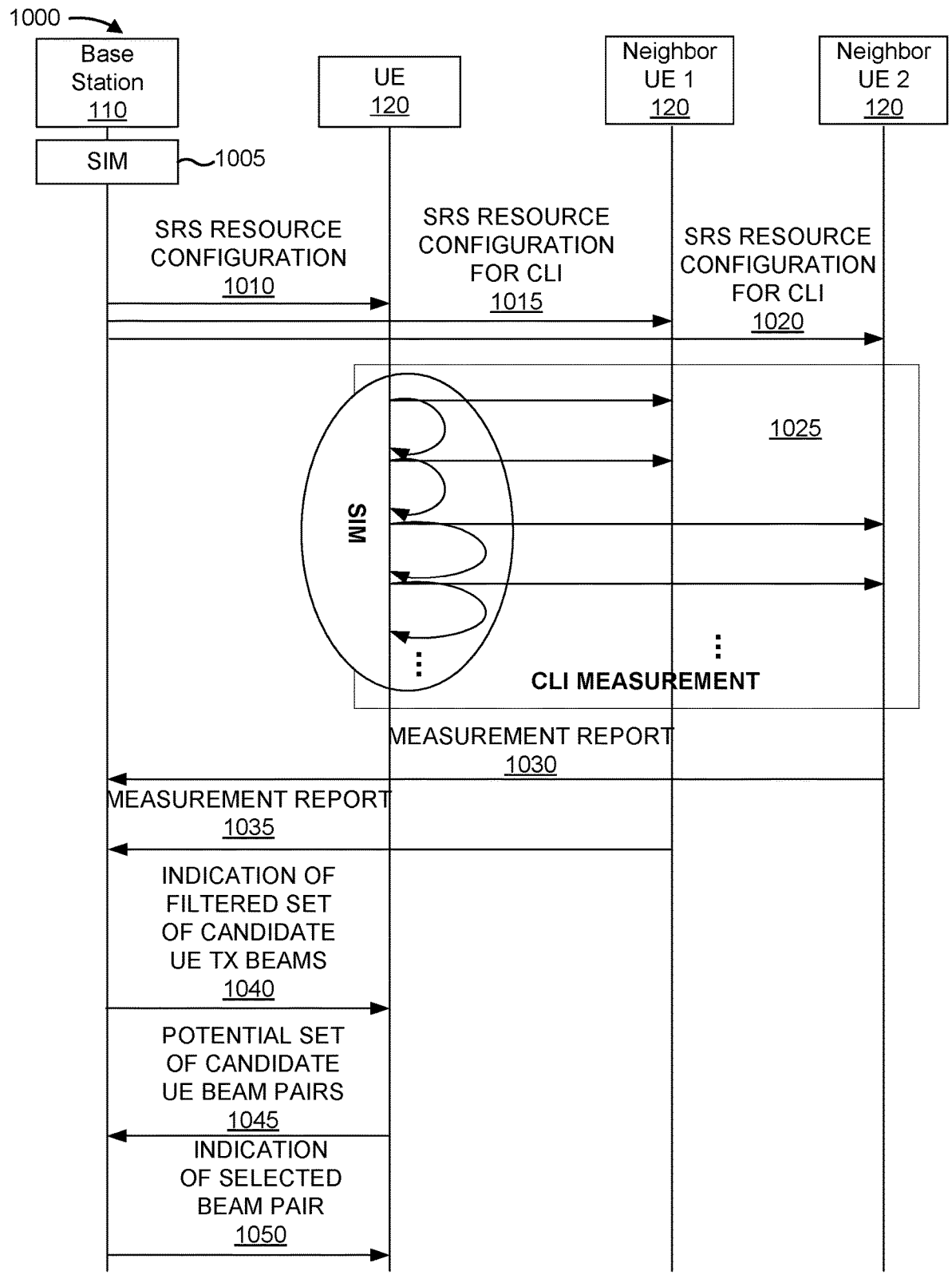
FIG. 10 is a diagram illustrating an example of a call flow illustrating beam pair selection using uplink and downlink measurements, in accordance with the present disclosure.

FIG. 10 is a diagram illustrating an example 1000 of a call flow illustrating beam pair selection using uplink and downlink measurements, in accordance with the present disclosure. Example 1000 includes a base station 110, a UE 120, a first neighbor UE 120 (shown as "neighbor UE 1"), and a second neighbor UE 120 (shown as "neighbor UE 2"). The base station 110 may provide a cell serving the UE 120. In the example 1000, the UE 120 obtains a plurality of beam measurements using a beam measurement procedure that is based at least in part on a CLI configuration and that is performed concurrently with a CLI procedure.

As shown by reference number 1005, the base station 110 may perform a base station SIM. In some aspects, the base station 110 may use one or more of the operations described in connection with reference number 905 of FIG. 9 to perform the base station SIM. As shown by reference number 1010, the base station 110 may transmit, and the UE 120 may receive, a sounding reference signal (SRS) resource configuration. In some aspects, the SRS configuration may configure a set of SRS resources for a UE SIM and an inter-UE CLI measurement. In some aspects, an SRS resource of the set of SRS resources may correspond to a UE UL transmission SRS beam. In some aspects, the UL UE beam in a UE beam pair of the set of identified UE beam pairs may include the UE UL transmission SRS beam.

As shown by reference number 1015, the base station 110 may transmit, and the neighbor UE 1 120 may receive, an SRS resource configuration for an inter-UE CLI measurement. As shown by reference number 1020, base station 110 may transmit, and the neighbor UE 2 120 may receive, an SRS resource configuration for an inter-UE CLI measurement. As shown by reference number 1025, the UE 120 performs a UE SIM procedure concurrently with an inter-UE CLI procedure. In some aspects, as shown, the UE 120 obtains a plurality of beam measurements using a beam measurement procedure that is based at least in part on a CLI configuration and that is performed concurrently with a CLI procedure. In some aspects, the measurements are performed on pre-grouped beam pairs.

In some aspects, the UE 120 may transmit an SRS using the UE UL transmission SRS beam based at least in part on the SRS resource configuration. In some aspects, the UE 102 may perform the UE SIM based at least in part on the SRS. The UE 120, the neighbor UE 1 120, and/or the neighbor UE 2 120 may perform inter-UE CLI measurements based at least in part on the SRS. The UE 120 may determine one or more candidate UE beam pairs based at least in part on the UE SIM. In some aspects, the one or more candidate UE beam pairs may be determined based at least in part on UE beam pairs of the set of candidate UE beam pairs satisfying a threshold.

As shown by reference number 1030, the neighbor UE 2 120 may transmit, and the base station 110 may receive, a measurement report. In some aspects, the measurement report may include an inter-UE measurement report. As shown by reference number 1035, the neighbor UE 1 120 may transmit, and the base station 110 may receive, a measurement report. The measurement report may indicate an inter-UE CLI measurement.

As shown by reference number 1040, the base station 110 may transmit, and the UE 120 may receive, an indication of a filtered set of candidate UE transmission beams. In some aspects, the filtered set of candidate UE transmission beams may be based at least in part on a filter associated with CLI. In some aspects, the UE 120 may filter, based at least in part on the inter-UE CLI measurement, the filtered set of candidate UE transmission beams to generate a potential set of candidate UE beam pairs. As shown by reference number 1045, the UE 120 may transmit, and the base station 110 may receive, an indication of the potential set of candidate UE beam pairs.

As shown by reference number 1050, the base station 110 may transmit, and the UE 120 may receive, an indication of selected UE beam pairs. In some aspects, the base station 110 may select the UE beam pair based at least in part on a UE SIM report, a CLI report transmitted by the neighbor UE 1 120, a CLI report transmitted by the neighbor UE 2 120, and/or the like.

As indicated above, FIG. 10 is provided as an example. Other examples may differ from what is described with regard to FIG. 10.

Figure 11:
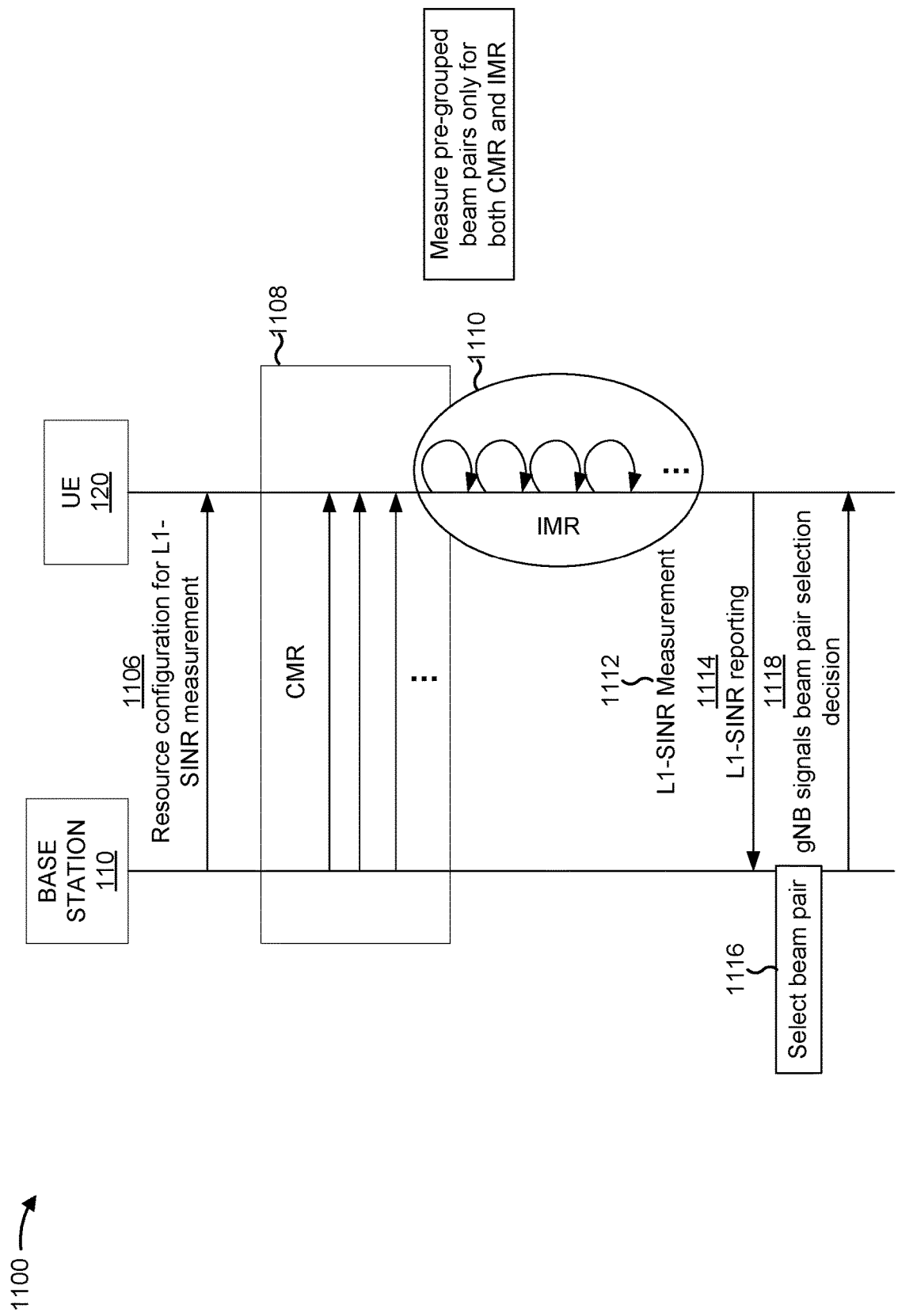
FIG. 11 is a diagram illustrating an example of a call flow illustrating beam pair selection using uplink and downlink measurements, in accordance with the present disclosure.

FIG. 11 is a diagram illustrating an example 1100 of a call flow illustrating beam pair selection using uplink and downlink measurements, in accordance with the present disclosure. Example 1100 includes a base station 110 and a UE 120. The base station 110 may provide a cell serving the UE 120. In the example 1100, the UE 120 obtains a plurality of beam measurements using a beam measurement procedure that is based at least in part on an L1-SINR measurement configuration.

As illustrated in FIG. 11, the base station 110 may transmit, and the UE 120 may receive, a resource configuration 1106 to perform an L1-SINR measurement. In some aspects, the L1-SINR configuration 1106 may indicate a first resource setting corresponding to a CM process 1108. In some aspects, the first resource setting may indicate at least CMR associated with at least one DL beam of the set of identified UE beam pairs that is to receive an associated CSI-RS transmission from the base station 110.

In some aspects, L1-SINR configuration 1106 may indicate a second resource setting corresponding to a UE SIM process 1110. In some aspects, the second resource setting may indicate at least one IMR associated with at least one beam pair of the set of identified UE beam pairs. In some aspects, a DL beam of the at least one beam pair may be the same beam as a DL beam associated with the CMR. In some aspects, the IMR may correspond to at least one SRS to be received by at least one UL beam of the at least one beam pair.

In some aspects, the L1-SINR measurement configuration 1106 may indicate a one-to-one mapping between the at least one CMR and the at least one IMR. In some aspects, the first resource setting and the second resource setting may be configured in a time division multiplexed (TDM) configuration, a frequency division multiplexed (FDM) configuration, and/or the like.

In some aspects, the UE 120 may perform the CM process 1108 based on a set of identified UE beam pairs indicated by the base station 110. In some aspects, the CM process 1108 may comprise performing a channel measurement between each of the subset of Rx beams with a corresponding antenna array panel of the plurality of different antenna array panels associated with the identified beam pairs, and an associated Tx beam at the base station 110.

The UE 120 may perform the SIM process 1110 by sweeping through transmitting SRSs from a same Tx beam corresponding to each Rx beam of one antenna array panel of a plurality of different antenna array panels corresponding to the identified beam pairs. The configuration for the SIM process 1110 may configure the UE 120 to receive the transmitted SRS incrementally through other Rx beams associated with the plurality of different panels corresponding to the identified beam pairs. In some aspects, the SIM process 1110 may modify an IM process of an L1-SINR measurement. In some aspects, a plurality of Tx beams may be received by each Rx beam of one panel of the plurality of different panels.

In some aspects, the UE 120 may determine a subset of Rx beams based on a beam measurement process associated with the set of identified UE beam pairs. The base station 110 may configure the UE 120 to perform the beam measurement process. Each Rx beam of the subset of Rx beams may be associated with one antenna array panel of a plurality of different antenna array panels. The beam measurement process may comprise receiving, from the base station 110, an SRS at each Rx beam of the plurality of different antenna array panels, wherein each Rx beam may be associated with a Tx beam from the base station 110. The subset of Rx beams may be indicated as top candidate beams selected from the set of identified UE beam pairs based on the beam management process to be used for sweeping through SRS of the SIM process 1110.

The UE 120 may measure, for at least one pair of Tx/Rx beams of the subset of beams, a self-interference based on the received SRS in the SIM process 1110. In some aspects, the UE 120 may report a panel ID associated with each Rx beam of the subset of beams. The UE 120 may report the panel ID associated with each Rx beam of the subset of beams to the base station 110.

The UE 120 may determine an SINR 1112 based on results of the CM process 1108 and the SIM process 1110. A CMR of the CM process 1108 may be mapped to one or more IMRs of the SIM process 1110. The SINR 1112 may be determined by each pair of CMR and IMR measurement results. The UE 120 may select one or more pairs of Tx/Rx beams, from the set of identified UE beam pairs, having the highest SINR values. In some aspects, the UE 120 may select M pairs of Tx/Rx beams based on the SINR, where M≥0. The UE 120 may report the selected Tx/Rx beams to the base station 110. The UE 120 may select the one or more pairs of Tx/Rx beams based on the SINR values 1112.

The UE 120, at 1114, may transmit, to the base station 110, an SINR report indicating the SINR results for each pair of CMR and IMR. The SINR report may include one or more SINR values for each of the subset of Rx beams with an associated Tx beam of the UE and corresponding Tx and Rx beam IDs or corresponding CSI-RS IDs or resource IDs. The UE 120 may select the top one or more DL and UL beam pairs based on the SINR values to perform L1-SINR reporting based on an actual value or a largest value plus a differential value of SINR, wherein the top one or more DL and UL beams pairs satisfy a threshold. In some aspects, the UE 120 may report that no DL and UL beam pairs are to perform L1-SINR reporting if none of the DL and UL beam pairs satisfy the threshold. In some aspects, the threshold may be configured by the base station 110 and signaled to the UE 120 via radio resource control (RRC) signaling, a medium access control control element (MAC-CE), or downlink control information (DCI). In some aspects, the UE 120 may receive, from the base station 110, an indication 1118 of a selection of the DL and UL beam pairs.

The base station 110, at 1116, may select a Tx UL beam/Rx DL beam pair, associated with the set of identified UE beam pairs, based on the received SINR report 1114 from the UE 120. In some aspects, selecting the Tx beam/Rx beam pair may include selecting a Tx beam or an Rx beam that may be greater than an SINR threshold. In some aspects, the base station 110 may receive, from the UE 120, an indication that a pair of Tx/Rx beams may not be compatible for the SIM if the pair of Tx/Rx beams are on the same antenna array panel. In some aspects, results of the SIM process may indicate that measurements associated with the pair of Tx/Rx beams identified as not compatible for the SIM process may be reported as a background interference value instead of a self-interference value.

In some aspects, the base station 110 may send, to the UE 120, an indication as to whether to transmit the SRS if the SRS beam and the self-interference measurement beam are on the same panel. In some aspects, if the indication configures the UE 120 to transmit the SRS using beams on the same panel, then the UE 120 may be configured to use the SRS for CLI measurements but not for the SIM process 1110. In some aspects, the base station 110 may receive, from the UE 120, the indication that the pair of Tx/Rx beam may not be compatible in a SIM configuration phase, if the Tx/Rx beams are on the same panel.

In some aspects, the UE 120 may report, to the base station 110, a pair of Tx/Rx beams that may not be compatible for the SIM process if the pair of Tx/Rx beams are on the same antenna array panel. In some aspects, the results of the SIM process may indicate that measurements associated with the pair of Tx/Rx beams identified as not compatible for the SIM process may be reported as a background interference value instead of a self-interference value. In some aspects, the UE 120 may receive, from the base station 110, an indication as to whether to transmit the SRS if the SRS beam and the self-interference measurement beam are on the same panel. In instances where the indication indicates that the UE is to transmit the SRS using beams on the same panel, then the SRS may be used for CLI measurements but not for the SIM process. In some aspects, the UE 120 may be configured to indicate that the pair of Tx/Rx beams may not be compatible in a SIM configuration phase, if the Tx/Rx beams are on the same panel.

As indicated above, FIG. 11 is provided as an example. Other examples may differ from what is provided with regard to FIG. 11.

Figure 12:
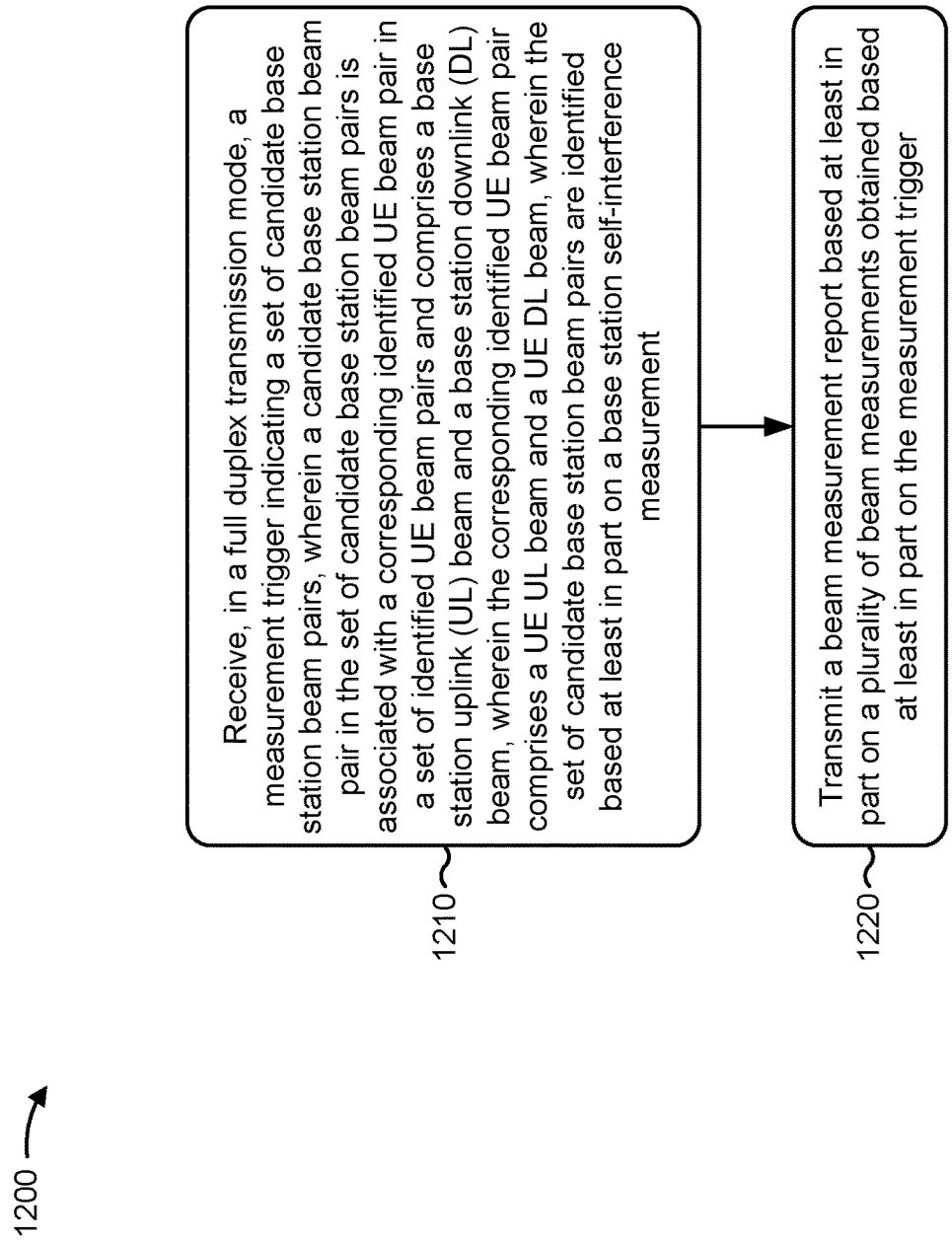
FIG. 12 is a diagram illustrating an example process performed, for example, by a user equipment, in accordance with the present disclosure.

FIG. 12 is a diagram illustrating an example process 1200 performed, for example, by a UE, in accordance with the present disclosure. Example process 1200 is an example where the UE (e.g., UE 120 and/or the like) performs operations associated with full duplex DL and UL beam pair selection.

As shown in FIG. 12, in some aspects, process 1200 may include receiving, from a base station, in a full duplex transmission mode, a measurement trigger indicating a set of candidate base station beam pairs, wherein a candidate base station beam pair in the set of candidate base station beam pairs is associated with a corresponding identified UE beam pair in a set of identified UE beam pairs and comprises a base station UL beam and a base station DL beam, wherein the corresponding identified UE beam pair comprises a UE UL beam and a UE DL beam, wherein the set of candidate base station beam pairs are identified based at least in part on a base station SIM (block 1210). For example, the UE (e.g., using receive processor 258, controller/processor 280, memory 282, and/or the like) may receive, from a base station, in a full duplex transmission mode, a measurement trigger indicating a set of candidate base station beam pairs, as described above. In some aspects, a candidate base station beam pair in the set of candidate base station beam pairs is associated with a corresponding identified UE beam pair in a set of identified UE beam pairs and comprises a base station UL beam and a base station DL beam. In some aspects, the corresponding identified UE beam pair comprises a UE UL beam and a UE DL beam. In some aspects, the set of candidate base station beam pairs are identified based at least in part on a base station SIM.

As further shown in FIG. 12, in some aspects, process 1200 may include transmitting, to the base station, a beam measurement report based at least in part on a plurality of beam measurements obtained based at least in part on the measurement trigger (block 1220). For example, the UE (e.g., using transmit processor 264, controller/processor 280, memory 282, and/or the like) may transmit, to the base station, a beam measurement report based at least in part on a plurality of beam measurements obtained based at least in part on the measurement trigger, as described above.

Process 1200 may include additional aspects, such as any single aspect or any combination of aspects described below and/or in connection with one or more other processes described elsewhere herein.

In a first aspect, the beam measurement report indicates one or more candidate UE beam pairs in the set of identified UE beam pairs based at least in part on one or more of the plurality of beam measurements satisfying a threshold.

In a second aspect, alone or in combination with the first aspect, process 1200 includes receiving, from the base station, an indication of a selected base station beam pair in the set of candidate base station beam pairs and a selected UE beam pair in the set of identified UE beam pairs, wherein the selected base station beam pair and the selected UE beam pair are selected based at least in part on the beam measurement report and the base station SIM.

In a third aspect, alone or in combination with one or more of the first and second aspects, the beam measurement report indicates that no identified UE beam pairs are to be used based at least in part on none of the plurality of beam measurements satisfying a threshold.

In a fourth aspect, alone or in combination with one or more of the first through third aspects, the beam measurement report comprises a UE SIM report.

In a fifth aspect, alone or in combination with one or more of the first through fourth aspects, the base station SIM is based at least in part on a transmission of at least one of: an SSB, a CSI-RS, or a combination thereof.

In a sixth aspect, alone or in combination with one or more of the first through fifth aspects, the CSI-RS comprises a dedicated CSI-RS transmitted using CSI-RS resources allocated for self-interference measurement.

In a seventh aspect, alone or in combination with one or more of the first through sixth aspects, the CSI-RS comprises a CSI-RS transmitted for use in a beam management procedure.

In an eighth aspect, alone or in combination with one or more of the first through seventh aspects, the CSI-RS comprises a CMR configured for use in a CM procedure.

In a ninth aspect, alone or in combination with one or more of the first through eighth aspects, process 1200 includes receiving, from the base station, a plurality of RSs; obtaining a plurality of RS measurements based at least in part on the plurality of RSs; and transmitting an RS report to the base station, wherein the set of candidate base station beam pairs is identified based at least in part on the RS report.

In a tenth aspect, alone or in combination with one or more of the first through ninth aspects, the plurality of RSs comprises CSI-RSs.

In an eleventh aspect, alone or in combination with one or more of the first through tenth aspects, the RS report comprises a CSI-RS beam report.

In a twelfth aspect, alone or in combination with one or more of the first through eleventh aspects, the CSI-RS beam report indicates at least one of: a set of beams that satisfy a first quality threshold, a set of beams that fail to satisfy a second quality threshold, or a combination thereof.

In a thirteenth aspect, alone or in combination with one or more of the first through twelfth aspects, a pair of the set of candidate base station beam pairs comprises a base station DL Tx RS beam that corresponds to a UE DL reception RS beam.

In a fourteenth aspect, alone or in combination with one or more of the first through thirteenth aspects, a pair of the set of candidate base station beam pairs comprises a base station UL Rx RS beam that corresponds to a UE UL transmission RS beam.

In a fifteenth aspect, alone or in combination with one or more of the first through fourteenth aspects, process 1200 includes transmitting, to the base station, a beam filter indication to facilitate filtering intra-panel beam pairs associated with the UE, wherein the beam filter indication indicates at least one of: a panel ID corresponding to a panel associated with the UE, an intra-panel relationship between two or more beams, or a combination thereof.

In a sixteenth aspect, alone or in combination with one or more of the first through fifteenth aspects, the set of identified UE beam pairs do not include the two or more beams.

In a seventeenth aspect, alone or in combination with one or more of the first through sixteenth aspects, a selected UE beam pair does not include the two or more beams.

In an eighteenth aspect, alone or in combination with one or more of the first through seventeenth aspects, the beam filter indication is transmitted with a CSI-RS report.

In a nineteenth aspect, alone or in combination with one or more of the first through eighteenth aspects, the measurement trigger comprises an allocation, to the UE, of a resource for transmitting an RS for performing an intended beam measurement corresponding to a UE beam pair of the set of identified UE beam pairs.

In a twentieth aspect, alone or in combination with one or more of the first through nineteenth aspects, the UE beam pair comprises intra-panel UE beams, and process 1200 includes refraining from transmitting the RS using the resource.

In a twenty-first aspect, alone or in combination with one or more of the first through twentieth aspects, process 1200 includes transmitting the RS using the resource; and performing a measurement that is different than an intended self-interference beam measurement, wherein the measurement includes at least one cross link interference measurement associated with a neighbor UE.

In a twenty-second aspect, alone or in combination with one or more of the first through twenty-first aspects, the UE beam pair comprises intra-panel UE beams, and process 1200 includes refraining from transmitting the RS using the resource; and performing a measurement, at a UE DL beam of the UE beam pair, that is different than an intended self-interference beam measurement, wherein the measurement includes at least one background interference measurement.

In a twenty-third aspect, alone or in combination with one or more of the first through twenty-second aspects, process 1200 includes obtaining the plurality of beam measurements using a beam measurement procedure, wherein the beam measurement procedure is based at least in part on a CLI configuration and is performed concurrently with a CLI procedure.

In a twenty-fourth aspect, alone or in combination with one or more of the first through twenty-third aspects, process 1200 includes receiving, from the base station, an SRS resource configuration that configures a set of SRS resources for a UE SIM and an inter-UE CLI measurement, wherein an SRS resource of the set of SRS resources corresponds to a UE UL transmission SRS beam, wherein the UL UE beam in a UE beam pair of the set of identified UE beam pairs comprises the UE UL transmission SRS beam; transmitting an SRS using the UE UL transmission SRS beam based at least in part on the SRS configuration; performing the UE SIM based at least in part on the SRS; and determining the one or more candidate UE beam pairs based at least in part on the UE SIM.

In a twenty-fifth aspect, alone or in combination with one or more of the first through twenty-fourth aspects, the SRS is to facilitate the inter-UE CLI measurement associated with the UE and a neighbor UE.

In a twenty-sixth aspect, alone or in combination with one or more of the first through twenty-fifth aspects, a selected UE beam pair is selected based at least in part on a CLI measurement report transmitted by the neighbor UE, and the CLI measurement report indicates the inter-UE CLI measurement.

In a twenty-seventh aspect, alone or in combination with one or more of the first through twenty-sixth aspects, the one or more candidate UE beam pairs are determined based at least in part on UE beam pairs of the set of candidate UE beam pairs satisfying a threshold.

In a twenty-eighth aspect, alone or in combination with one or more of the first through twenty-seventh aspects, the set of identified UE beam pairs are identified based at least in part on a CLI measurement report transmitted by the neighbor UE, and the CLI measurement report indicates the inter-UE CLI measurement.

In a twenty-ninth aspect, alone or in combination with one or more of the first through twenty-eighth aspects, process 1200 includes receiving, from the base station, an indication of a filtered set of candidate UE transmission beams, wherein the filtered set of candidate UE transmission beams is based at least in part on a filter associated with cross link interference; filtering, based at least in part on the inter-UE CLI measurement, the filtered set of candidate UE transmission beams to generate a potential set of candidate UE beam pairs; and selecting the one or more UE beam pairs from the potential set of candidate UE beam pairs based at least in part on at least one of: a cross beam RSRP measurement, a CLI SRS-RSRP measurement, or a combination thereof.

In a thirtieth aspect, alone or in combination with one or more of the first through twenty-ninth aspects, the beam measurement report indicates the one or more candidate UE beam pairs using corresponding CSI-RS identifiers.

In a thirty-first aspect, alone or in combination with one or more of the first through thirtieth aspects, process 1200 includes receiving an indication of the inter-UE CLI measurement from the base station.

In a thirty-second aspect, alone or in combination with one or more of the first through thirty-first aspects, a selected UE beam pair is selected based at least in part on a UE SIM report and a CLI report transmitted by a neighbor UE.

In a thirty-third aspect, alone or in combination with one or more of the first through thirty-second aspects, process 1200 includes obtaining the plurality of beam measurements using a beam measurement procedure, wherein the beam measurement procedure is based at least in part on an L1-SINR measurement configuration.

In a thirty-fourth aspect, alone or in combination with one or more of the first through thirty-third aspects, the L1-SINR measurement configuration indicates: a first resource setting corresponding to a CM process, the first resource setting indicating at least one CMR associated with at least one DL beam of the set of identified UE beam pairs that is to receive an associated channel state information reference signal transmission from the base station; and a second resource setting corresponding to a UE SIM process, the second resource setting indicating at least one IMR associated with at least one beam pair of the set of identified UE beam pairs, wherein a DL beam of the at least one beam pair is the same beam as a DL beam associated with the CMR, and wherein the IMR corresponds to at least one sounding reference signal to be received by at least one UL beam of the at least one beam pair.

In a thirty-fifth aspect, alone or in combination with one or more of the first through thirty-fourth aspects, the L1-SINR measurement configuration further indicates a one-to-one mapping between the at least one CMR and the at least one IMR.

In a thirty-sixth aspect, alone or in combination with one or more of the first through thirty-fifth aspects, the first resource setting and the second resource setting are configured in a TDM configuration.

In a thirty-seventh aspect, alone or in combination with one or more of the first through thirty-sixth aspects, the first resource setting and the second resource setting are configured in an FDM configuration.

In a thirty-eighth aspect, alone or in combination with one or more of the first through thirty-seventh aspects, process 1200 includes selecting, as the one or more candidate UE beam pairs, a top one or more UE beam pairs of the set of identified UE beam pairs based at least in part on one or more L1-SINR measurement values, the one or more L1-SINR measurement values comprising at least one of: an actual L1-SINR measurement value, a largest L1-SINR measurement value plus a differential L1-SINR measurement value, or a combination thereof.

In a thirty-ninth aspect, alone or in combination with one or more of the first through thirty-eighth aspects, the top one or more UE beam pairs of the set of identified UE beam pairs is selected based at least in part on the L1-SINR measurement value satisfying a threshold.

Although FIG. 12 shows example blocks of process 1200, in some aspects, process 1200 may include additional blocks, fewer blocks, different blocks, or differently arranged blocks than those depicted in FIG. 12. Additionally, or alternatively, two or more of the blocks of process 1200 may be performed in parallel.

Figure 13:
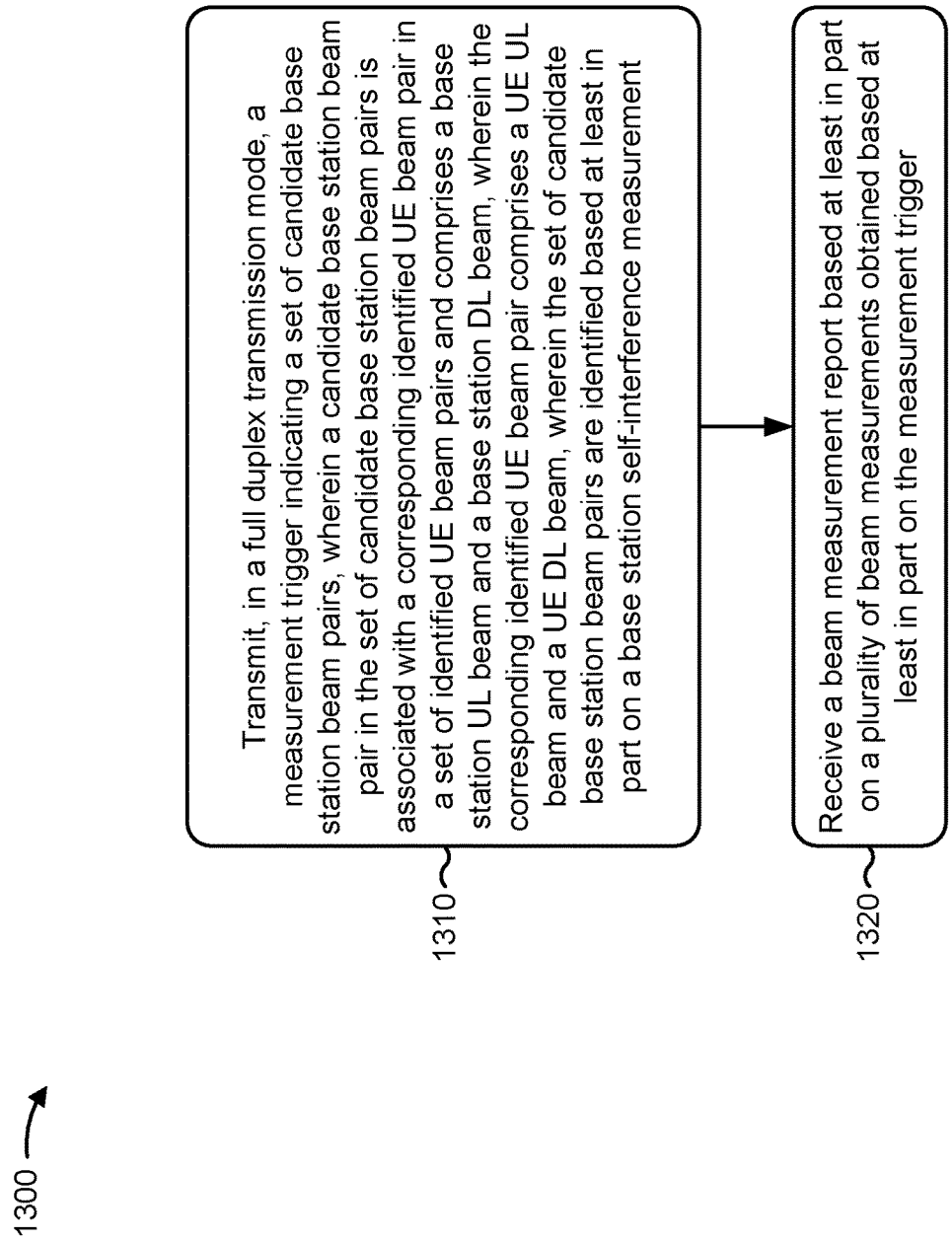
FIG. 13 is a diagram illustrating an example process performed, for example, by a base station, in accordance with the present disclosure.

FIG. 13 is a diagram illustrating an example process 1300 performed, for example, by a base station, in accordance with the present disclosure. Example process 1300 is an example where the base station (e.g., base station 110 and/or the like) performs operations associated with full duplex DL and UL beam pair selection.

As shown in FIG. 13, in some aspects, process 1300 may include transmitting, to a UE, in a full duplex transmission mode, a measurement trigger indicating a set of candidate base station beam pairs, wherein a candidate base station beam pair in the set of candidate base station beam pairs is associated with a corresponding identified UE beam pair in a set of identified UE beam pairs and comprises a base station UL beam and a base station DL beam, wherein the corresponding identified UE beam pair comprises a UE UL beam and a UE DL beam, wherein the set of candidate base station beam pairs are identified based at least in part on a base station SIM (block 1310). For example, the base station (e.g., using transmit processor 220, controller/processor 240, memory 242, and/or the like) may transmit, to a UE, in a full duplex transmission mode, a measurement trigger indicating a set of candidate base station beam pairs, as described above. In some aspects, a candidate base station beam pair in the set of candidate base station beam pairs is associated with a corresponding identified UE beam pair in a set of identified UE beam pairs and comprises a base station UL beam and a base station DL beam. In some aspects, the corresponding identified UE beam pair comprises a UE UL beam and a UE DL beam. In some aspects, the set of candidate base station beam pairs are identified based at least in part on a base station SIM.

As further shown in FIG. 13, in some aspects, process 1300 may include receiving, from the UE, a beam measurement report based at least in part on a plurality of beam measurements obtained based at least in part on the measurement trigger (block 1320). For example, the base station (e.g., using receive processor 238, controller/processor 240, memory 242, and/or the like) may receive, from the UE, a beam measurement report based at least in part on a plurality of beam measurements obtained based at least in part on the measurement trigger, as described above.

Process 1300 may include additional aspects, such as any single aspect or any combination of aspects described below and/or in connection with one or more other processes described elsewhere herein.

In a first aspect, the beam measurement report indicates one or more candidate UE beam pairs in the set of identified UE beam pairs based at least in part on one or more of the plurality of beam measurements satisfying a threshold.

In a second aspect, alone or in combination with the first aspect, process 1300 includes transmitting, to the UE, an indication of a selected base station beam pair in the set of candidate base station beam pairs and a selected UE beam pair in the set of identified UE beam pairs, wherein the selected base station beam pair and the selected UE beam pair are selected based at least in part on the beam measurement report and the base station SIM.

In a third aspect, alone or in combination with one or more of the first and second aspects, the beam measurement report indicates that no identified UE beam pairs are to be used based at least in part on none of the plurality of beam measurements satisfying a threshold.

In a fourth aspect, alone or in combination with one or more of the first through third aspects, the beam measurement report comprises a UE SIM report.

In a fifth aspect, alone or in combination with one or more of the first through fourth aspects, the base station self-interference measurement is based at least in part on a transmission of at least one of: an SSB, a CSI-RS, or a combination thereof.

In a sixth aspect, alone or in combination with one or more of the first through fifth aspects, the CSI-RS comprises a dedicated CSI-RS transmitted using CSI-RS resources allocated for self-interference measurement.

In a seventh aspect, alone or in combination with one or more of the first through sixth aspects, the CSI-RS comprises a CSI-RS transmitted for use in a beam management procedure.

In an eighth aspect, alone or in combination with one or more of the first through seventh aspects, the CSI-RS comprises a CMR configured for use in a CM procedure.

In a ninth aspect, alone or in combination with one or more of the first through eighth aspects, process 1300 includes transmitting, to the UE, a plurality of RSs; and receiving, from the UE, an RS report indicating a plurality of RS measurements based at least in part on the plurality of RSs, wherein the set of candidate base station beam pairs is identified based at least in part on the RS report.

In a tenth aspect, alone or in combination with one or more of the first through ninth aspects, the plurality of RSs comprises CSI-RSs.

In an eleventh aspect, alone or in combination with one or more of the first through tenth aspects, the RS report comprises a CSI-RS beam report.

In a twelfth aspect, alone or in combination with one or more of the first through eleventh aspects, the CSI-RS beam report indicates at least one of: a set of beams that satisfy a first quality threshold, a set of beams that fail to satisfy a second quality threshold, or a combination thereof.

In a thirteenth aspect, alone or in combination with one or more of the first through twelfth aspects, a pair of the set of candidate base station beam pairs comprises a base station DL transmission RS beam that corresponds to a UE DL reception RS beam.

In a fourteenth aspect, alone or in combination with one or more of the first through thirteenth aspects, a pair of the set of candidate base station beam pairs comprises a base station UL reception RS beam that corresponds to a UE UL transmission RS beam.

In a fifteenth aspect, alone or in combination with one or more of the first through fourteenth aspects, process 1300 includes receiving, from the UE, a beam filter indication to facilitate filtering intra-panel beam pairs associated with the UE, wherein the beam filter indication indicates at least one of: a panel ID corresponding to a panel associated with the UE, an intra-panel relationship between two or more beams, or a combination thereof.

In a sixteenth aspect, alone or in combination with one or more of the first through fifteenth aspects, the set of identified UE beam pairs do not include the two or more beams.

In a seventeenth aspect, alone or in combination with one or more of the first through sixteenth aspects, a selected UE beam pair does not include the two or more beams.

In an eighteenth aspect, alone or in combination with one or more of the first through seventeenth aspects, the beam filter indication is transmitted with a channel state information reference signal report.

In a nineteenth aspect, alone or in combination with one or more of the first through eighteenth aspects, the measurement trigger comprises an allocation, to the UE, of a resource for transmitting a RS for performing an intended beam measurement corresponding to a UE beam pair of the set of identified UE beam pairs.

In a twentieth aspect, alone or in combination with one or more of the first through nineteenth aspects, the UE beam pair comprises intra-panel UE beams, and the RS is not transmitted using the resource.

In a twenty-first aspect, alone or in combination with one or more of the first through twentieth aspects, the UE beam pair comprises intra-panel UE beams, and the RS is to facilitate a measurement that is different than an intended self-interference beam measurement, and the measurement includes at least one cross link interference measurement associated with a neighbor UE.

In a twenty-second aspect, alone or in combination with one or more of the first through twenty-first aspects, the UE beam pair comprises intra-panel UE beams, the RS is not transmitted using the resource, and a measurement associated with the allocation corresponds to a UE DL beam of the UE beam pair and is different than an intended self-interference beam measurement, where the measurement includes at least one background interference measurement.

In a twenty-third aspect, alone or in combination with one or more of the first through twenty-second aspects, the plurality of beam measurements are based at least in part on a beam measurement procedure, the beam measurement procedure is based at least in part on a CLI configuration and is performed concurrently with a CLI procedure.

In a twenty-fourth aspect, alone or in combination with one or more of the first through twenty-third aspects, process 1300 includes transmitting, to the UE, an SRS resource configuration that configures a set of SRS resources for a UE SIM and an inter-UE CLI measurement, wherein an SRS resource of the set of SRS resources corresponds to a UE UL transmission SRS beam, wherein the UL UE beam in a UE beam pair of the set of identified UE beam pairs comprises the UE UL transmission SRS beam, wherein an SRS, using the UE UL transmission SRS beam based at least in part on the SRS configuration, is to facilitate the UE SIM based at least in part on the SRS, and wherein the one or more candidate UE beam pairs are based at least in part on the UE SIM.

In a twenty-fifth aspect, alone or in combination with one or more of the first through twenty-fourth aspects, the SRS is to facilitate the inter-UE CLI measurement associated with the UE and a neighbor UE.

In a twenty-sixth aspect, alone or in combination with one or more of the first through twenty-fifth aspects, a selected UE beam pair is selected based at least in part on a CLI measurement report transmitted by the neighbor UE, the CLI measurement report indicates the inter-UE CLI measurement.

In a twenty-seventh aspect, alone or in combination with one or more of the first through twenty-sixth aspects, the one or more candidate UE beam pairs are determined based at least in part on UE beam pairs of the set of candidate UE beam pairs satisfying a threshold.

In a twenty-eighth aspect, alone or in combination with one or more of the first through twenty-seventh aspects, the set of identified UE beam pairs are identified based at least in part on a CLI measurement report transmitted by the neighbor UE, the CLI measurement report indicates the inter-UE CLI measurement.

In a twenty-ninth aspect, alone or in combination with one or more of the first through twenty-eighth aspects, process 1300 includes receiving, from the base station, an indication of a filtered set of candidate UE transmission beams, wherein the filtered set of candidate UE transmission beams is based at least in part on a filter associated with cross link interference; filtering, based at least in part on the inter-UE CLI measurement, the filtered set of candidate UE transmission beams to generate a potential set of candidate UE beam pairs; and selecting the one or more UE beam pairs from the potential set of candidate UE beam pairs based at least in part on at least one of: a cross beam SRP measurement, a CLI SRS-RSRP measurement, or a combination thereof.

In a thirtieth aspect, alone or in combination with one or more of the first through twenty-ninth aspects, the beam measurement report indicates the one or more candidate UE beam pairs using corresponding CSI-RS identifiers.

In a thirty-first aspect, alone or in combination with one or more of the first through thirtieth aspects, process 1300 includes transmitting, to the UE, an indication of the inter-UE CLI measurement.

In a thirty-second aspect, alone or in combination with one or more of the first through thirty-first aspects, a selected UE beam pair is selected based at least in part on a UE SIM report and a CLI report transmitted by a neighbor UE.

In a thirty-third aspect, alone or in combination with one or more of the first through thirty-second aspects, the plurality of beam measurements are based at least in part on a beam measurement procedure, the beam measurement procedure is based at least in part on an L1-SINR measurement configuration.

In a thirty-fourth aspect, alone or in combination with one or more of the first through thirty-third aspects, the L1-SINR measurement configuration indicates: a first resource setting corresponding to a CM process, the first resource setting indicating at least one CMR associated with at least one DL beam of the set of identified UE beam pairs that is to receive an associated channel state information reference signal transmission from the base station; and a second resource setting corresponding to a UE SIM process, the second resource setting indicating at least one IMR associated with at least one beam pair of the set of identified UE beam pairs, wherein a DL beam of the at least one beam pair is the same beam as a DL beam associated with the CMR, and wherein the IMR corresponds to at least one sounding reference signal to be received by at least one UL beam of the at least one beam pair.

In a thirty-fifth aspect, alone or in combination with one or more of the first through thirty-fourth aspects, the L1-SINR measurement configuration further indicates a one-to-one mapping between the at least one CMR and the at least one IMR.

In a thirty-sixth aspect, alone or in combination with one or more of the first through thirty-fifth aspects, the first resource setting and the second resource setting are configured in a TDM configuration.

In a thirty-seventh aspect, alone or in combination with one or more of the first through thirty-sixth aspects, the first resource setting and the second resource setting are configured in an FDM configuration.

In a thirty-eighth aspect, alone or in combination with one or more of the first through thirty-seventh aspects, the one or more candidate UE beam pairs comprise a top one or more UE beam pairs of the set of identified UE beam pairs selected based at least in part on one or more L1-SINR measurement values, and the one or more L1-SINR measurement values comprise at least one of: an actual L1-SINR measurement value, a largest L1-SINR measurement value plus a differential L1-SINR measurement value, or a combination thereof.

In a thirty-ninth aspect, alone or in combination with one or more of the first through thirty-eighth aspects, the top one or more UE beam pairs of the set of identified UE beam pairs is selected based at least in part on the L1-SINR measurement value satisfying a threshold.

Although FIG. 13 shows example blocks of process 1300, in some aspects, process 1300 may include additional blocks, fewer blocks, different blocks, or differently arranged blocks than those depicted in FIG. 13. Additionally, or alternatively, two or more of the blocks of process 1300 may be performed in parallel.

The following provides an overview of some Aspects of the present disclosure:

Aspect 1: A method of wireless communication performed by a user equipment (UE), comprising: receiving, from a base station, in a full duplex transmission mode, a measurement trigger indicating a set of candidate base station beam pairs, wherein a candidate base station beam pair in the set of candidate base station beam pairs is associated with a corresponding identified UE beam pair in a set of identified UE beam pairs and comprises a base station uplink (UL) beam and a base station downlink (DL) beam, wherein the corresponding identified UE beam pair comprises a UE UL beam and a UE DL beam, wherein the set of candidate base station beam pairs are identified based at least in part on a base station self-interference measurement (SIM); and transmitting, to the base station, a beam measurement report based at least in part on a plurality of beam measurements obtained based at least in part on the measurement trigger.

Aspect 2: The method of Aspect 1, wherein the beam measurement report indicates one or more candidate UE beam pairs in the set of identified UE beam pairs based at least in part on one or more of the plurality of beam measurements satisfying a threshold.

Aspect 3: The method of either of Aspects 1 or 2, further comprising: receiving, from the base station, an indication of a selected base station beam pair in the set of candidate base station beam pairs and a selected UE beam pair in the set of identified UE beam pairs, wherein the selected base station beam pair and the selected UE beam pair are selected based at least in part on the beam measurement report and the base station SIM.

Aspect 4: The method of either of Aspects 1 or 2, wherein the beam measurement report indicates that no identified UE beam pairs are to be used based at least in part on none of the plurality of beam measurements satisfying a threshold.

Aspect 5: The method of any of Aspects 1-4, wherein the beam measurement report comprises a UE SIM report.

Aspect 6: The method of any of Aspects 1-5, wherein the base station self-interference measurement is based at least in part on a transmission of at least one of: a synchronization signal block, a channel state information reference signal (CSI-RS), or a combination thereof.

Aspect 7: The method of Aspect 6, wherein the CSI-RS comprises a dedicated CSI-RS transmitted using CSI-RS resources allocated for self-interference measurement.

Aspect 8: The method of either of Aspects 6 or 7, wherein the CSI-RS comprises a CSI-RS transmitted for use in a beam management procedure.

Aspect 9: The method of any of Aspects 6-8, wherein the CSI-RS comprises a channel measurement (CM) resource configured for use in a CM procedure.

Aspect 10: The method of any of Aspects 1-9, further comprising: receiving, from the base station, a plurality of reference signals (RSs); obtaining a plurality of RS measurements based at least in part on the plurality of RSs; and transmitting an RS report to the base station, wherein the set of candidate base station beam pairs is identified based at least in part on the RS report.

Aspect 11: The method of Aspect 10, wherein the plurality of RSs comprises channel state information RSs (CSI-RSs).

Aspect 12: The method of Aspect 11, wherein the RS report comprises a CSI-RS beam report.

Aspect 13: The method of Aspect 12, wherein the CSI-RS beam report indicates at least one of: a set of beams that satisfy a first quality threshold, a set of beams that fail to satisfy a second quality threshold, or a combination thereof.

Aspect 14: The method of any of Aspects 1-13, wherein a pair of the set of candidate base station beam pairs comprises a base station DL transmission reference signal (RS) beam that corresponds to a UE DL reception RS beam.

Aspect 15: The method of any of Aspects 1-14, wherein a pair of the set of candidate base station beam pairs comprises a base station UL reception reference signal (RS) beam that corresponds to a UE UL transmission RS beam.

Aspect 16: The method of any of Aspects 1-15, further comprising: transmitting, to the base station, a beam filter indication to facilitate filtering intra-panel beam pairs associated with the UE, wherein the beam filter indication indicates at least one of: a panel identifier corresponding to a panel associated with the UE, an intra-panel relationship between two or more beams, or a combination thereof.

Aspect 17: The method of Aspect 16, wherein the set of identified UE beam pairs do not include the two or more beams.

Aspect 18: The method of either of Aspects 16 or 17, wherein a selected UE beam pair does not include the two or more beams.

Aspect 19: The method of any of Aspects 16-18, wherein the beam filter indication is transmitted with a channel state information reference signal report.

Aspect 20: The method of any of Aspects 1-19, wherein the measurement trigger comprises an allocation, to the UE, of a resource for transmitting a reference signal (RS) for performing an intended beam measurement corresponding to a UE beam pair of the set of identified UE beam pairs.

Aspect 21: The method of Aspect 20, wherein the UE beam pair comprises intra-panel UE beams, the method further comprising: refraining from transmitting the RS using the resource.

Aspect 22: The method of Aspect 20, wherein the UE beam pair comprises intra-panel UE beams, the method further comprising: transmitting the RS using the resource; and performing a measurement that is different than an intended self-interference beam measurement, wherein the measurement includes at least one cross link interference measurement associated with a neighbor UE.

Aspect 23: The method of Aspect 20, wherein the UE beam pair comprises intra-panel UE beams, the method further comprising: refraining from transmitting the RS using the resource; and performing a measurement, at a UE DL beam of the UE beam pair, that is different than an intended self-interference beam measurement, wherein the measurement includes at least one background interference measurement.

Aspect 24: The method of any of Aspects 1-23, further comprising: obtaining the plurality of beam measurements using a beam measurement procedure, wherein the beam measurement procedure is based at least in part on a cross link interference (CLI) configuration and is performed concurrently with a CLI procedure.

Aspect 25: The method of any of Aspects 1-24, further comprising: receiving, from the base station, a sounding reference signal (SRS) resource configuration that configures a set of SRS resources for a UE SIM and an inter-UE cross link interference (CLI) measurement, wherein an SRS resource of the set of SRS resources corresponds to a UE UL transmission SRS beam, wherein the UL UE beam in a UE beam pair of the set of identified UE beam pairs comprises the UE UL transmission SRS beam; transmitting an SRS using the UE UL transmission SRS beam based at least in part on the SRS configuration; performing the UE SIM based at least in part on the SRS; and determining the one or more candidate UE beam pairs based at least in part on the UE SIM.

Aspect 26: The method of Aspect 25, wherein the SRS is to facilitate the inter-UE CLI measurement associated with the UE and a neighbor UE.

Aspect 27: The method of Aspect 26, wherein a selected UE beam pair is selected based at least in part on a CLI measurement report transmitted by the neighbor UE, wherein the CLI measurement report indicates the inter-UE CLI measurement.

Aspect 28: The method of either of Aspects 26 or 27, wherein the one or more candidate UE beam pairs are determined based at least in part on UE beam pairs of the set of candidate UE beam pairs satisfying a threshold.

Aspect 29: The method of any of Aspects 26-28, wherein the set of identified UE beam pairs are identified based at least in part on a CLI measurement report transmitted by the neighbor UE, wherein the CLI measurement report indicates the inter-UE CLI measurement.

Aspect 30: The method of Aspect 29, further comprising: receiving, from the base station, an indication of a filtered set of candidate UE transmission beams, wherein the filtered set of candidate UE transmission beams is based at least in part on a filter associated with cross link interference; filtering, based at least in part on the inter-UE CLI measurement, the filtered set of candidate UE transmission beams to generate a potential set of candidate UE beam pairs; and selecting the one or more UE beam pairs from the potential set of candidate UE beam pairs based at least in part on at least one of: a cross beam reference signal received power (RSRP)

measurement, a CLI sounding reference signals reference signal received power measurement, or a combination thereof.

Aspect 31: The method of either of Aspects 29 or 30, wherein the beam measurement report indicates the one or more candidate UE beam pairs using corresponding channel state information reference signal identifiers.

Aspect 32: The method of any of Aspects 29-31, further comprising receiving an indication of the inter-UE CLI measurement from the base station.

Aspect 33: The method of any of Aspects 1-32, wherein a selected UE beam pair is selected based at least in part on a UE SIM report and a CLI report transmitted by a neighbor UE.

Aspect 34: The method of any of Aspects 1-33, further comprising: obtaining the plurality of beam measurements using a beam measurement procedure, wherein the beam measurement procedure is based at least in part on a layer one signal to interference plus noise ratio (L1-SINR) measurement configuration.

Aspect 35: The method of Aspect 34, wherein the L1-SINR measurement configuration indicates: a first resource setting corresponding to a channel measurement (CM) process, the first resource setting indicating at least one CM resource (CMR) associated with at least one DL beam of the set of identified UE beam pairs that is to receive an associated channel state information reference signal transmission from the base station; and a second resource setting corresponding to a UE SIM process, the second resource setting indicating at least one interference measurement resource (IMR) associated with at least one beam pair of the set of identified UE beam pairs, wherein a DL beam of the at least one beam pair is the same beam as a DL beam associated with the CMR, and wherein the IMR corresponds to at least one sounding reference signal to be received by at least one UL beam of the at least one beam pair.

Aspect 36: The method of Aspect 35, wherein the L1-SINR measurement configuration further indicates a one-to-one mapping between the at least one CMR and the at least one IMR.

Aspect 37: The method of either of Aspects 35 or 36, wherein the first resource setting and the second resource setting are configured in a time division multiplexed (TDM) configuration.

Aspect 38: The method of any of Aspects 35-37, wherein the first resource setting and the second resource setting are configured in a frequency division multiplexed (FDM) configuration.

Aspect 39: The method of any of Aspects 34-38, further comprising: selecting, as the one or more candidate UE beam pairs, a top one or more UE beam pairs of the set of identified UE beam pairs based at least in part on one or more L1-SINR measurement values, the one or more L1-SINR measurement values comprising at least one of: an actual L1-SINR measurement value, a largest L1-SINR measurement value plus a differential L1-SINR measurement value, or a combination thereof.

Aspect 40: The method of Aspect 39, wherein the top one or more UE beam pairs of the set of identified UE beam pairs is selected based at least in part on the L1-SINR measurement value satisfying a threshold.

Aspect 41: A method of wireless communication performed by a base station, comprising: transmitting, to a user equipment (UE), in a full duplex transmission mode, a measurement trigger indicating a set of candidate base station beam pairs, wherein a candidate base station beam pair in the set of candidate base station beam pairs is associated with a corresponding identified UE beam pair in a set of identified UE beam pairs and comprises a base station uplink (UL) beam and a base station downlink (DL) beam, wherein the corresponding identified UE beam pair comprises a UE UL beam and a UE DL beam, wherein the set of candidate base station beam pairs are identified based at least in part on a base station self-interference measurement (SIM); and receiving, from the UE, a beam measurement report based at least in part on a plurality of beam measurements obtained based at least in part on the measurement trigger.

Aspect 42: The method of Aspect 41, wherein the beam measurement report indicates one or more candidate UE beam pairs in the set of identified UE beam pairs based at least in part on one or more of the plurality of beam measurements satisfying a threshold.

Aspect 43: The method of either of Aspects 41 or 42, further comprising: transmitting, to the UE, an indication of a selected base station beam pair in the set of candidate base station beam pairs and a selected UE beam pair in the set of identified UE beam pairs, wherein the selected base station beam pair and the selected UE beam pair are selected based at least in part on the beam measurement report and the base station SIM.

Aspect 44: The method of either of Aspects 41 or 42, wherein the beam measurement report indicates that no identified UE beam pairs are to be used based at least in part on none of the plurality of beam measurements satisfying a threshold.

Aspect 45: The method of any of Aspects 41-44, wherein the beam measurement report comprises a UE SIM report.

Aspect 46: The method of any of Aspects 41-44, wherein the base station self-interference measurement is based at least in part on a transmission of at least one of: a synchronization signal block, a channel state information reference signal (CSI-RS), or a combination thereof.

Aspect 47: The method of Aspect 46, wherein the CSI-RS comprises a dedicated CSI-RS transmitted using CSI-RS resources allocated for self-interference measurement.

Aspect 48: The method of either of Aspects 46 or 47, wherein the CSI-RS comprises a CSI-RS transmitted for use in a beam management procedure.

Aspect 49: The method of any of Aspects 46-48, wherein the CSI-RS comprises a channel measurement (CM) resource configured for use in a CM procedure.

Aspect 50: The method of any of Aspects 41-49, further comprising: transmitting, to the UE, a plurality of reference signals (RSs); and receiving, from the UE, an RS report indicating a plurality of RS measurements based at least in part on the plurality of RSs, wherein the set of candidate base station beam pairs is identified based at least in part on the RS report.

Aspect 51: The method of Aspect 50, wherein the plurality of RSs comprise channel state information RSs (CSI-RSs).

Aspect 52: The method of Aspect 51, wherein the RS report comprises a CSI-RS beam report.

Aspect 53: The method of Aspect 52, wherein the CSI-RS beam report indicates at least one of: a set of beams that satisfy a first quality threshold, a set of beams that fail to satisfy a second quality threshold, or a combination thereof.

Aspect 54: The method of any of Aspects 41-53, wherein a pair of the set of candidate base station beam pairs comprises a base station DL transmission reference signal (RS) beam that corresponds to a UE DL reception RS beam.

Aspect 55: The method of any of Aspects 41-54, wherein a pair of the set of candidate base station beam pairs comprises a base station UL reception reference signal (RS) beam that corresponds to a UE UL transmission RS beam.

Aspect 56: The method of any of Aspects 41-55, further comprising: receiving, from the UE, a beam filter indication to facilitate filtering intra-panel beam pairs associated with the UE, wherein the beam filter indication indicates at least one of: a panel identifier corresponding to a panel associated with the UE, an intra-panel relationship between two or more beams, or a combination thereof.

Aspect 57: The method of Aspect 56, wherein the set of identified UE beam pairs do not include the two or more beams.

Aspect 58: The method of either of Aspects 56 or 57, wherein a selected UE beam pair does not include the two or more beams.

Aspect 59: The method of any of Aspects 56-58, wherein the beam filter indication is transmitted with a channel state information reference signal report.

Aspect 60: The method of any of Aspects 41-59, wherein the measurement trigger comprises an allocation, to the UE, of a resource for transmitting a reference signal (RS) for performing an intended beam measurement corresponding to a UE beam pair of the set of identified UE beam pairs.

Aspect 61: The method of Aspect 60, wherein the UE beam pair comprises intra-panel UE beams, and wherein the RS is not transmitted using the resource.

Aspect 62: The method of either of Aspects 60 or 61, wherein the UE beam pair comprises intra-panel UE beams, wherein the RS is to facilitate a measurement that is different than an intended self-interference beam measurement, and wherein the measurement includes at least one cross link interference measurement associated with a neighbor UE.

Aspect 63: The method of any of Aspects 60-62, wherein the UE beam pair comprises intra-panel UE beams, wherein the RS is not transmitted using the resource, and wherein a measurement associated with the allocation corresponds to a UE DL beam of the UE beam pair and is different than an intended self-interference beam measurement, wherein the measurement includes at least one background interference measurement.

Aspect 64: The method of any of Aspects 41-63, wherein the plurality of beam measurements are based at least in part on a beam measurement procedure, wherein the beam measurement procedure is based at least in part on a cross link interference (CLI) configuration and is performed concurrently with a CLI procedure.

Aspect 65: The method of any of Aspects 41-64, further comprising: transmitting, to the UE, a sounding reference signal (SRS) resource configuration that configures a set of SRS resources for a UE SIM and an inter-UE cross link interference (CLI) measurement, wherein an SRS resource of the set of SRS resources corresponds to a UE UL transmission SRS beam, wherein the UL UE beam in a UE beam pair of the set of identified UE beam pairs comprises the UE UL transmission SRS beam, wherein an SRS, using the UE UL transmission SRS beam based at least in part on the SRS configuration, is to facilitate the UE SIM based at least in part on the SRS, and wherein the one or more candidate UE beam pairs are based at least in part on the UE SIM.

Aspect 66: The method of Aspect 65, wherein the SRS is to facilitate the inter-UE CLI measurement associated with the UE and a neighbor UE.

Aspect 67: The method of Aspect 66, wherein a selected UE beam pair is selected based at least in part on a CLI measurement report transmitted by the neighbor UE, wherein the CLI measurement report indicates the inter-UE CLI measurement.

Aspect 68: The method of either of Aspects 66 or 67, wherein the one or more candidate UE beam pairs are determined based at least in part on UE beam pairs of the set of candidate UE beam pairs satisfying a threshold.

Aspect 69: The method of any of Aspects 66-68, wherein the set of identified UE beam pairs are identified based at least in part on a CLI measurement report transmitted by the neighbor UE, wherein the CLI measurement report indicates the inter-UE CLI measurement.

Aspect 70: The method of Aspect 69, further comprising: receiving, from the base station, an indication of a filtered set of candidate UE transmission beams, wherein the filtered set of candidate UE transmission beams is based at least in part on a filter associated with cross link interference; filtering, based at least in part on the inter-UE CLI measurement, the filtered set of candidate UE transmission beams to generate a potential set of candidate UE beam pairs; and selecting the one or more UE beam pairs from the potential set of candidate UE beam pairs based at least in part on at least one of: a cross beam reference signal received power (RSRP) measurement, a CLI sounding reference signals reference signal received power measurement, or a combination thereof.

Aspect 71: The method of either of Aspects 69 or 70, wherein the beam measurement report indicates the one or more candidate UE beam pairs using corresponding channel state information reference signal identifiers.

Aspect 72: The method of any of Aspects 69-71, further comprising transmitting, to the UE, an indication of the inter-UE CLI measurement.

Aspect 73: The method of any of Aspects 41-72, wherein a selected UE beam pair is selected based at least in part on a UE SIM report and a CLI report transmitted by a neighbor UE.

Aspect 74: The method of any of Aspects 41-73, wherein the plurality of beam measurements are based at least in part on a beam measurement procedure, wherein the beam measurement procedure is based at least in part on a layer one signal to interference plus noise ratio (L1-SINR) measurement configuration.

Aspect 75: The method of Aspect 74, wherein the L1-SINR measurement configuration indicates: a first resource setting corresponding to a channel measurement (CM) process, the first resource setting indicating at least one CM resource (CMR) associated with at least one DL beam of the set of identified UE beam pairs that is to receive an associated channel state information reference signal transmission from the base station; and a second resource setting corresponding to a UE SIM process, the second resource setting indicating at least one interference measurement resource (IMR) associated with at least one beam pair of the set of identified UE beam pairs, wherein a DL beam of the at least one beam pair is the same beam as a DL beam associated with the CMR, and wherein the IMR corresponds to at least one sounding reference signal to be received by at least one UL beam of the at least one beam pair.

Aspect 76: The method of Aspect 75, wherein the L1-SINR measurement configuration further indicates a one-to-one mapping between the at least one CMR and the at least one IMR.

Aspect 77: The method of either of Aspects 75 or 76, wherein the first resource setting and the second resource setting are configured in a time division multiplexed (TDM) configuration.

Aspect 78: The method of any of Aspects 75-77, wherein the first resource setting and the second resource setting are configured in a frequency division multiplexed (FDM) configuration.

Aspect 79: The method of any of Aspects 74-78, wherein the one or more candidate UE beam pairs comprise a top one or more UE beam pairs of the set of identified UE beam pairs selected based at least in part on one or more L1-SINR measurement values, the one or more L1-SINR measurement values comprising at least one of: an actual L1-SINR measurement value, a largest L1-SINR measurement value plus a differential L1-SINR measurement value, or a combination thereof.

Aspect 80: The method of Aspect 79, wherein the top one or more UE beam pairs of the set of identified UE beam pairs is selected based at least in part on the L1-SINR measurement value satisfying a threshold.

Aspect 81: An apparatus for wireless communication at a device, comprising a processor; memory coupled with the processor; and instructions stored in the memory and executable by the processor to cause the apparatus to perform the method of one or more of Aspects 1-40.

Aspect 82: A device for wireless communication, comprising a memory and one or more processors coupled to the memory, the memory and the one or more processors configured to perform the method of one or more of Aspects 1-40.

Aspect 83: An apparatus for wireless communication, comprising at least one means for performing the method of one or more of Aspects 1-40.

Aspect 84: A non-transitory computer-readable medium storing code for wireless communication, the code comprising instructions executable by a processor to perform the method of one or more of Aspects 1-40.

Aspect 85: A non-transitory computer-readable medium storing a set of instructions for wireless communication, the set of instructions comprising one or more instructions that, when executed by one or more processors of a device, cause the device to perform the method of one or more of Aspects 1-40.

Aspect 86: An apparatus for wireless communication at a device, comprising a processor; memory coupled with the processor; and instructions stored in the memory and executable by the processor to cause the apparatus to perform the method of one or more of Aspects 41-80.

Aspect 87: A device for wireless communication, comprising a memory and one or more processors coupled to the memory, the memory and the one or more processors configured to perform the method of one or more of Aspects 41-80.

Aspect 88: An apparatus for wireless communication, comprising at least one means for performing the method of one or more of Aspects 41-80.

Aspect 89: A non-transitory computer-readable medium storing code for wireless communication, the code comprising instructions executable by a processor to perform the method of one or more of Aspects 41-80.

Aspect 90: A non-transitory computer-readable medium storing a set of instructions for wireless communication, the set of instructions comprising one or more instructions that, when executed by one or more processors of a device, cause the device to perform the method of one or more of Aspects 41-80.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:
a memory; and
one or more processors, coupled to the memory, configured to cause the UE to:
receive, from a base station, in a full duplex transmission mode, a measurement trigger indicating a set of candidate base station beam pairs, wherein a candidate base station beam pair in the set of candidate base station beam pairs is associated with a corresponding identified UE beam pair in a set of identified UE beam pairs and comprises a base station uplink (UL) beam and a base station downlink (DL) beam, wherein the corresponding identified UE beam pair comprises a UE UL beam and a UE DL beam, wherein the set of candidate base station beam pairs are identified based at least in part on a base station self-interference measurement (SIM); and
transmit, to the base station, a beam measurement report based at least in part on a plurality of beam measurements obtained based at least in part on the measurement trigger, wherein the beam measurement report comprises a UE SIM of the identified UE beam pair.

2. The UE of claim 1, wherein the beam measurement report indicates one or more candidate UE beam pairs in the set of identified UE beam pairs based at least in part on one or more of the plurality of beam measurements satisfying a threshold.

3. The UE of claim 1, wherein the one or more processors are further configured to cause the UE to:
receive, from the base station, an indication of a selected base station beam pair in the set of candidate base station beam pairs and a selected UE beam pair in the set of identified UE beam pairs, wherein the selected base station beam pair and the selected UE beam pair are selected based at least in part on the beam measurement report and the base station SIM.

4. The UE of claim 1, wherein the beam measurement report indicates that no identified UE beam pairs are to be used based at least in part on none of the plurality of beam measurements satisfying a threshold.

5. The UE of claim 1, wherein the base station self-interference measurement is based at least in part on a transmission of a channel state information reference signal (CSI-RS), wherein the CSI-RS comprises at least one of:
a dedicated CSI-RS transmitted using CSI-RS resources allocated for self-interference measurement,
a CSI-RS transmitted for use in a beam management procedure, or
a channel measurement (CM) resource configured for use in a CM procedure.

6. The UE of claim 1, wherein the one or more processors are further configured to cause the UE to:
receive, from the base station, a plurality of reference signals (RSs);
obtain a plurality of RS measurements based at least in part on the plurality of RSs; and
transmit an RS report to the base station, wherein the set of candidate base station beam pairs is identified based at least in part on the RS report.

7. The UE of claim 6, wherein the plurality of RSs comprises channel state information RSs (CSI-RSs), wherein the RS report comprises a CSI-RS beam report, wherein the CSI-RS beam report indicates at least one of:
a set of beams that satisfy a first quality threshold, or
a set of beams that fail to satisfy a second quality threshold.

8. The UE of claim 1, wherein a pair of the set of candidate base station beam pairs comprises at least one of:
a base station DL transmission reference signal (RS) beam that corresponds to a UE DL reception RS beam, or
a base station UL reception RS beam that corresponds to a UE UL transmission RS beam.

9. The UE of claim 1, wherein the one or more processors are further configured to cause the UE to:
transmit, to the base station, a beam filter indication to facilitate filtering intra-panel beam pairs associated with the UE,
wherein the beam filter indication indicates at least one of:
a panel identifier corresponding to a panel associated with the UE,
an intra-panel relationship between two or more beams, or
a combination thereof.

10. The UE of claim 9, wherein the beam filter indication is transmitted with a channel state information reference signal report.

11. The UE of claim 1, wherein the measurement trigger comprises an allocation, to the UE, of a resource for transmitting a reference signal (RS) for performing an intended beam measurement corresponding to a UE beam pair of the set of identified UE beam pairs.

12. The UE of claim 11, wherein the UE beam pair comprises intra-panel UE beams, and wherein the one or more processors are further configured to cause the UE to:
transmit the RS using the resource; and
perform a measurement that is different than an intended self-interference beam measurement, wherein the measurement includes at least one cross link interference measurement associated with a neighbor UE.

13. The UE of claim 11, wherein the UE beam pair comprises intra-panel UE beams, and wherein the one or more processors are further configured to perform at least one of:
refraining from transmitting the RS using the resource; and
performing a measurement, at a UE DL beam of the UE beam pair, that is different than an intended self-interference beam measurement, wherein the measurement includes at least one background interference measurement.

14. The UE of claim 1, wherein the one or more processors are further configured to cause the UE to:
obtain the plurality of beam measurements using a beam measurement procedure,
wherein the beam measurement procedure is based at least in part on a cross link interference (CLI) configuration and is performed concurrently with a CLI procedure.

15. The UE of claim 1, wherein the one or more processors are further configured to cause the UE to:
receive, from the base station, a sounding reference signal (SRS) resource configuration that configures a set of SRS resources for the UE SIM and an inter-UE cross link interference (CLI) measurement, wherein an SRS resource of the set of SRS resources corresponds to a UE UL transmission SRS beam, wherein the UL UE beam in a UE beam pair of the set of identified UE beam pairs comprises the UE UL transmission SRS beam;

transmit an SRS using the UE UL transmission SRS beam based at least in part on the SRS configuration;
perform the UE SIM based at least in part on the SRS; and
determine one or more candidate UE beam pairs based at least in part on the UE SIM.

16. The UE of claim 15, wherein the SRS is to facilitate the inter-UE CLI measurement associated with the UE and a neighbor UE.

17. The UE of claim 16, wherein a selected UE beam pair is selected based at least in part on a CLI measurement report transmitted by the neighbor UE, wherein the CLI measurement report indicates the inter-UE CLI measurement.

18. The UE of claim 17, wherein the one or more candidate UE beam pairs are determined based at least in part on UE beam pairs of the set of candidate UE beam pairs satisfying a threshold.

19. The UE of claim 17, wherein the set of identified UE beam pairs are identified based at least in part on a CLI measurement report transmitted by the neighbor UE, wherein the CLI measurement report indicates the inter-UE CLI measurement.

20. The UE of claim 19, wherein the one or more processors are further configured to cause the UE to:
receive, from the base station, an indication of a filtered set of candidate UE transmission beams, wherein the filtered set of candidate UE transmission beams is based at least in part on a filter associated with cross link interference;
filter, based at least in part on the inter-UE CLI measurement, the filtered set of candidate UE transmission beams to generate a potential set of candidate UE beam pairs; and
select the one or more UE beam pairs from the potential set of candidate UE beam pairs based at least in part on at least one of:
a cross beam reference signal received power (RSRP) measurement,
a CLI sounding reference signals reference signal received power measurement, or
a combination thereof.

21. The UE of claim 1, wherein a selected UE beam pair is selected based at least in part on the beam measurement report comprising a UE SIM report and a CLI report transmitted by a neighbor UE.

22. The UE of claim 1, wherein the one or more processors are further configured to cause the UE to:
obtain the plurality of beam measurements using a beam measurement procedure,
wherein the beam measurement procedure is based at least in part on a layer one signal to interference plus noise ratio (L1-SINR) measurement configuration.

23. The UE of claim 22, wherein the L1-SINR measurement configuration indicates:
a first resource setting corresponding to a channel measurement (CM) process, the first resource setting indicating at least one CM resource (CMR) associated with at least one DL beam of the set of identified UE beam pairs that is to receive an associated channel state information reference signal transmission from the base station; and
a second resource setting corresponding to a UE SIM process, the second resource setting indicating at least one interference measurement resource (IMR) associated with at least one beam pair of the set of identified UE beam pairs, wherein a DL beam of the at least one beam pair is a same beam as a DL beam associated with the CMR, and wherein the IMR corresponds to at least one sounding reference signal to be received by at least one UL beam of the at least one beam pair.

24. The UE of claim 23, wherein the L1-SINR measurement configuration further indicates a one-to-one mapping between the at least one CMR and the at least one IMR.

25. The UE of claim 24, wherein the first resource setting and the second resource setting are configured in at least one of a time division multiplexed (TDM) configuration or a frequency division multiplexed (FDM) configuration.

26. The UE of claim 24, wherein the one or more processors are further configured to cause the UE to:
select, as one or more candidate UE beam pairs, a top one or more UE beam pairs of the set of identified UE beam pairs based at least in part on one or more L1-SINR measurement values, the one or more L1-SINR measurement values comprising at least one of:
an actual L1-SINR measurement value,
a largest L1-SINR measurement value plus a differential L1-SINR measurement value, or
a combination thereof.

27. The UE of claim 26, wherein the top one or more UE beam pairs of the set of identified UE beam pairs is selected based at least in part on the L1-SINR measurement value satisfying a threshold.

28. A method of wireless communication performed by a user equipment (UE), comprising:
receiving, from a base station, in a full duplex transmission mode, a measurement trigger indicating a set of candidate base station beam pairs, wherein a candidate base station beam pair in the set of candidate base station beam pairs is associated with a corresponding identified UE beam pair in a set of identified UE beam pairs and comprises a base station uplink (UL) beam and a base station downlink (DL) beam, wherein the corresponding identified UE beam pair comprises a UE UL beam and a UE DL beam, wherein the set of candidate base station beam pairs are identified based at least in part on a base station self-interference measurement (SIM); and
transmitting, to the base station, a beam measurement report based at least in part on a plurality of beam measurements obtained based at least in part on the measurement trigger, wherein the beam measurement report comprises a UE SIM of the identified UE beam pair.

29. A method of wireless communication performed by a base station, comprising:
transmitting, to a user equipment (UE), in a full duplex transmission mode, a measurement trigger indicating a set of candidate base station beam pairs, wherein a candidate base station beam pair in the set of candidate base station beam pairs is associated with a corresponding identified UE beam pair in a set of identified UE beam pairs and comprises a base station uplink (UL) beam and a base station downlink (DL) beam, wherein the corresponding identified UE beam pair comprises a UE UL beam and a UE DL beam, wherein the set of candidate base station beam pairs are identified based at least in part on a base station self-interference measurement (SIM); and
receiving, from the UE, a beam measurement report based at least in part on a plurality of beam measurements obtained based at least in part on the measurement trigger, wherein the beam measurement report comprises a UE SIM of the identified UE beam pair.

30. A base station for wireless communication, comprising:
- a memory; and
- one or more processors, coupled to the memory, configured to cause the base station to:
  - transmit, to a user equipment (UE), in a full duplex transmission mode, a measurement trigger indicating a set of candidate base station beam pairs, wherein a candidate base station beam pair in the set of candidate base station beam pairs is associated with a corresponding identified UE beam pair in a set of identified UE beam pairs and comprises a base station uplink (UL) beam and a base station downlink (DL) beam, wherein the corresponding identified UE beam pair comprises a UE UL beam and a UE DL beam, wherein the set of candidate base station beam pairs are identified based at least in part on a base station self-interference measurement (SIM); and
  - receive, from the UE, a beam measurement report based at least in part on a plurality of beam measurements obtained based at least in part on the measurement trigger, wherein the beam measurement report comprises a UE SIM of the identified UE beam pair.

* * * * *